United States Patent
Shibutani

(10) Patent No.: US 11,038,193 B2
(45) Date of Patent: Jun. 15, 2021

(54) BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventor: Koji Shibutani, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 117 days.

(21) Appl. No.: 16/213,591

(22) Filed: Dec. 7, 2018

(65) Prior Publication Data
US 2019/0123310 A1    Apr. 25, 2019

Related U.S. Application Data

(63) Continuation of application No. PCT/JP2017/025390, filed on Jul. 12, 2017.

(30) Foreign Application Priority Data

Jul. 12, 2016 (JP) .............................. JP2016-137960

(51) Int. Cl.
*H01M 10/04*    (2006.01)
*H01M 10/0587*    (2010.01)
(Continued)

(52) U.S. Cl.
CPC ......... *H01M 10/0431* (2013.01); *H01M 4/13* (2013.01); *H01M 10/0525* (2013.01); *H01M 10/0587* (2013.01); *H01M 2004/028* (2013.01)

(58) Field of Classification Search
CPC ......... H01M 10/0431; H01M 10/0587; H01M 10/052; H01M 10/0525; H01M 4/13; H01M 2004/028
See application file for complete search history.

(56) References Cited

U.S. PATENT DOCUMENTS

2013/0004853 A1    1/2013  Wada et al.
2014/0120417 A1*   5/2014  Matsushita ........... H01M 4/667
                                                            429/211

FOREIGN PATENT DOCUMENTS

JP    2000021453 A    1/2000
JP    2009181833 A    8/2009
(Continued)

OTHER PUBLICATIONS

Machine translation of JP 2013-051028 A (cited in IDS) (Year: 2013).*

(Continued)

*Primary Examiner* — Eugenia Wang
(74) *Attorney, Agent, or Firm* — K&L Gates LLP

(57) ABSTRACT

A battery incudes wound positive and negative electrodes, where the wound positive electrode includes a positive electrode current collector, a first positive electrode active material layer provided on an inner surface of the positive electrode current collector, and a second positive electrode active material layer provided on an outer surface of the positive electrode current collector. An inner circumference side end portion and an outer circumference side end portion of the positive electrode current collector are covered with the first active material layer, and the first positive electrode active material layer includes a low area density portion in a portion facing an inner circumference side end portion of the wound positive electrode.

15 Claims, 10 Drawing Sheets

(51) Int. Cl.
*H01M 10/0525* (2010.01)
*H01M 4/13* (2010.01)
*H01M 4/02* (2006.01)

(56) References Cited

FOREIGN PATENT DOCUMENTS

| | | |
|---|---|---|
| JP | 2013016260 A | 1/2013 |
| JP | 2013051028 A | 3/2013 |
| JP | 2013171669 A | 9/2013 |
| WO | 2016116971 A1 | 7/2016 |

OTHER PUBLICATIONS

International Search Report for Application No. PCT/JP2017/025390, dated Oct. 17, 2017.

* cited by examiner

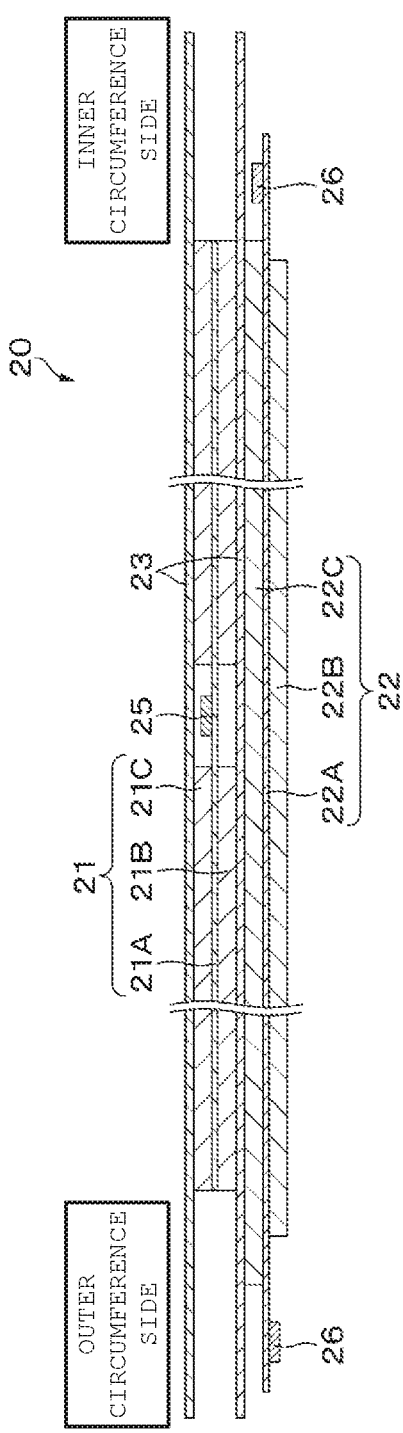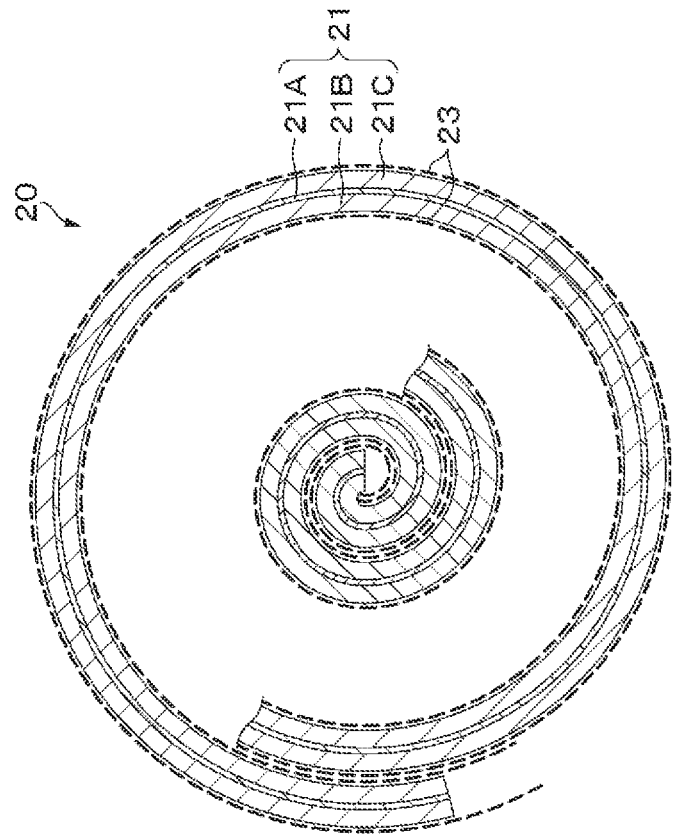
FIG. 9A
FIG. 9B

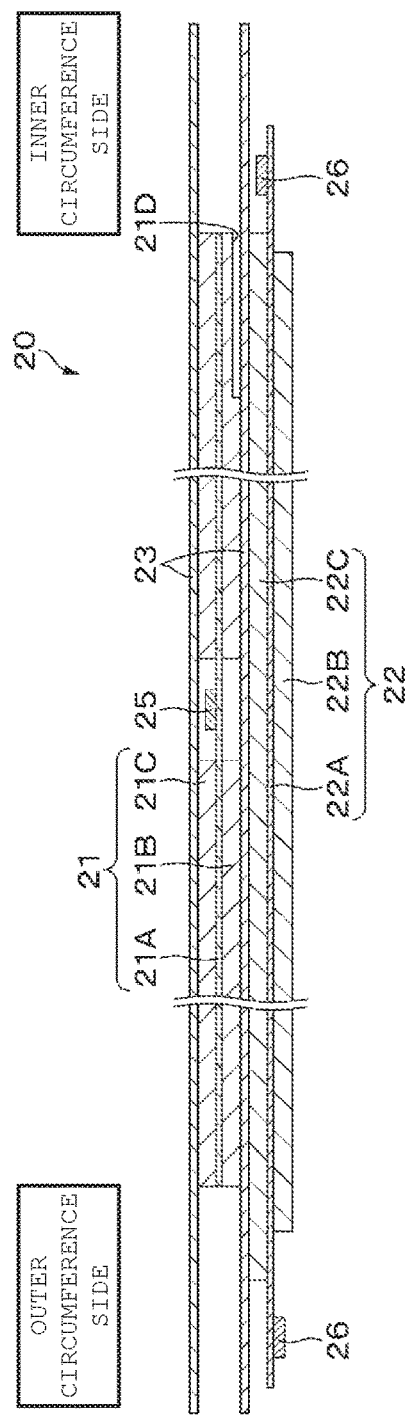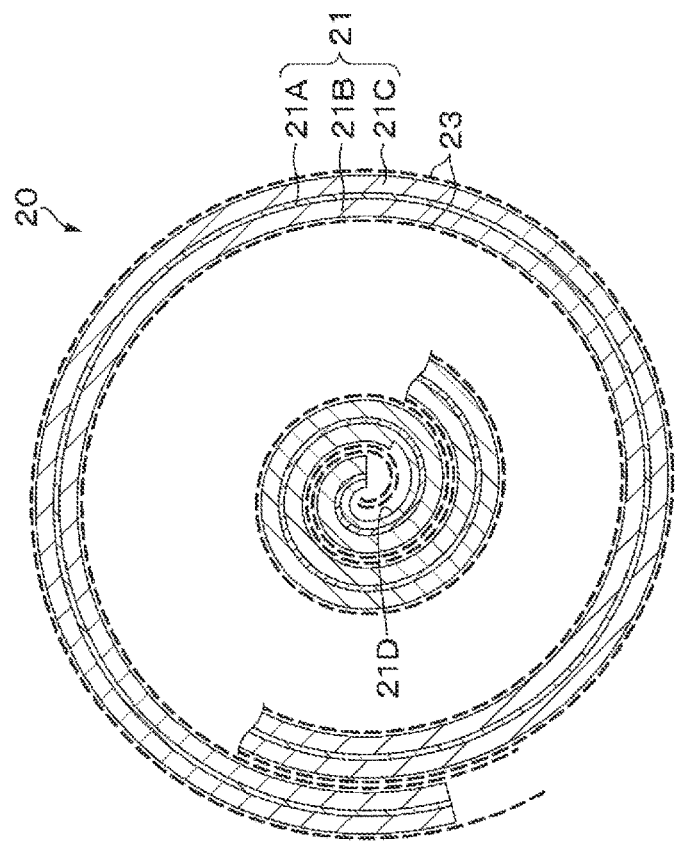
FIG. 10A
FIG. 10B

BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2017/025390, filed on Jul. 12, 2017, which claims priority to Japanese patent application no. JP2016-137960 filed on Jul. 12, 2016, the entire contents of which are being incorporated herein by reference.

BACKGROUND

The present technology generally relates to a battery including wound positive and negative electrodes, a battery pack including the battery, an electronic device, an electric vehicle, a power storage device, and a power system.

A battery having a structure in which elongated positive and negative electrodes are wound has been widely used. In the battery having the wound structure, there is a structure in which both sides of a positive electrode current collector are covered with a positive electrode active material layer so that the both sides of the positive electrode current collector is not exposed at both end portions on the inner circumference side and the outer circumference side of the positive electrode in order to improve safety (hereinafter, referred to as "non-exposed current collector structure").

SUMMARY

In the case of a battery having a non-exposed current collector structure, when positive and negative electrodes are wound to form a battery element, a break may be generated in the positive electrode, where the break is originated from a position of one circumferential outer side from a winding start end portion. This is because the positive electrode on one circumferential outer side from the winding start end portion is bent by the step difference by the thickness of the end portion of the positive electrode on the inner circumference side (="the thickness of the positive electrode current collector"+"the sum of the thickness of the positive electrode active material layer on both sides of the positive electrode current collector").

In the case of a structure in which one or both sides of the positive electrode current collector is exposed at the inner circumference side end portion of the positive electrode, the step difference is smaller than that in the case of the non-exposed current collector structure, whereby a break is hardly generated in the positive electrode. Therefore, the generation of a break in the positive electrode, the break being originated from the position of one circumferential outer side from the winding start end portion, is a phenomenon particularly likely to occur in the battery having the non-exposed current collector structure.

The present technology provides, in an embodiment, a battery having a non-exposed current collector structure at an inner circumference side end portion and an outer circumference side end portion of a positive electrode in which it is possible to prevent the generation of a break in the positive electrode, a battery pack including the battery, an electronic device, an electric vehicle, a power storage device, and a power system.

According to an embodiment of the present disclosure, a battery is provided. The battery includes a wound positive electrode and a wound negative electrode, where the positive electrode includes a positive electrode current collector, a first positive electrode active material layer provided on an inner surface of the positive electrode current collector, and a second positive electrode active material layer provided on an outer surface of the positive electrode current collector, an inner circumference side end portion and an outer circumference side end portion of the positive electrode current collector are covered with the first positive electrode active material layer, and the first positive electrode active material layer includes a low area density portion at an inner circumference side end portion of the wound positive electrode.

According to another embodiment of the present disclosure, a battery is provided. The battery includes a wound electrode, where the electrode includes a current collector, a first active material layer provided on an inner surface of the current collector, and a second active material layer provided on an outer surface of the current collector, an inner circumference side end portion and an outer circumference side end portion of the current collector are covered with the first active material layer and the second active material layer, and the first active material layer includes a low area density portion in a portion facing an inner circumference side end portion of the wound electrode.

The battery pack, the electronic device, the electric vehicle, the power storage device, and the power system of the present technology are provided with the above-mentioned battery.

As described above, according to the present technology, in the battery having the non-exposed structure at the inner circumference side end portion and the outer circumference side end portion of the positive electrode, it is possible to prevent the generation of a break in the positive electrode.

The effects described herein are non-limiting, and may be any one of effects described in the present technology, and where the present technology should not be interpreted as being limited by the exemplified effects and other suitable properties relating to the present technology may be realized and as further described.

BRIEF DESCRIPTION OF THE FIGURES

FIG. 9A is a cross-sectional view illustrating a configuration of a wound electrode body in an unwound state according to an embodiment of the present technology.

FIG. 9B is a cross-sectional view illustrating a wound structure of a positive electrode according to an embodiment of the present technology.

FIG. 10A is a cross-sectional view illustrating a configuration of a wound electrode body in an unwound state. FIG. 10B is a cross-sectional view illustrating a wound structure of a positive electrode according to an embodiment of the present technology.

DETAILED DESCRIPTION

The present technology generally relates to a battery including wound positive and negative electrodes, a battery pack including the battery, an electronic device, an electric vehicle, a power storage device, and a power system.

As described herein, the present disclosure will be described based on examples with reference to the drawings, but the present disclosure is not to be considered limited to the examples, and various numerical values and materials in the examples are considered by way of example.

Figure 1:
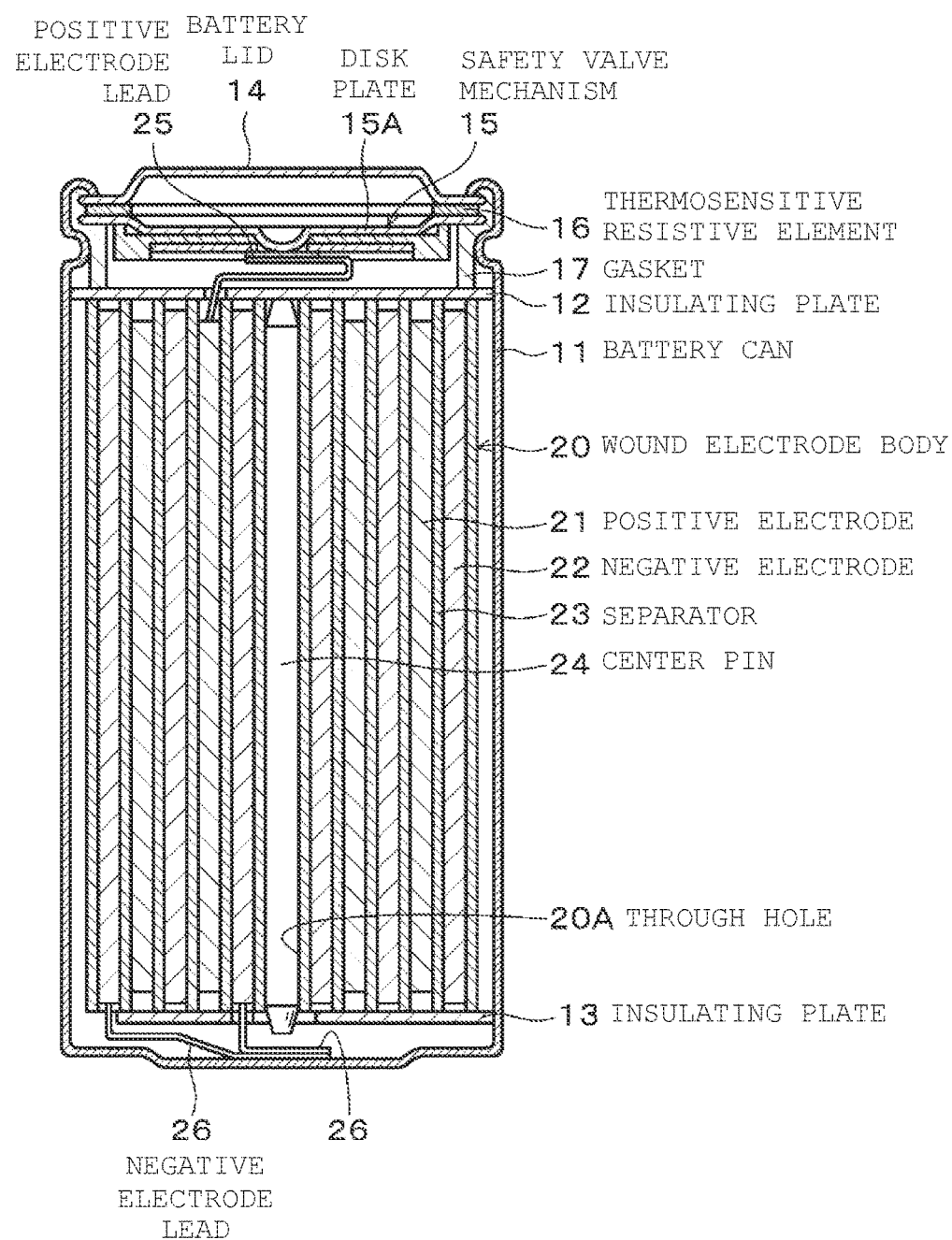
FIG. 1 is a cross-sectional view illustrating a configuration example of a nonaqueous electrolyte secondary battery according to an embodiment of the present technology.

Hereinafter, a configuration example of a nonaqueous electrolyte secondary battery (hereinafter, simply referred to as "battery") according to a first embodiment of the present technology will be described with reference to FIG. 1. This battery is, for example, a so-called lithium ion secondary battery in which the capacity of a negative electrode is represented by a capacity component determined by occlusion and release of lithium (Li) which is an electrode reactant. This nonaqueous electrolyte secondary battery is a so-called cylindrical type, and has a wound electrode body 20 in which a pair of a belt-like positive electrode 21 and a belt-like negative electrode 22 are laminated with a belt-like separator 23 interposed therebetween and wound in a cylindrical battery can 11 having one opened end and the other closed end. The positive electrode 21, the negative electrode 22, and the separator 23 are wound such that one end thereof in the longitudinal direction is on the inner circumference side of the wound electrode body 20 and the other end thereof in the longitudinal direction is on the outer circumference side of the wound electrode body 20. The battery can 11 is made of iron (Fe) plated with nickel (Ni), and has one opened end and the other closed end. An electrolytic solution as a liquid electrolyte is injected into the battery can 11, whereby the positive electrode 21, the negative electrode 22, and the separator 23 are impregnated with the electrolytic solution. Further, a pair of insulating plates 12 and 13 are disposed perpendicularly to the wound circumferential surface so as to sandwich the wound electrode body 20.

A battery lid 14, a safety valve mechanism 15, and a thermosensitive resistive element (positive temperature coefficient (PTC) element) 16 are caulked to the opened end of the battery can 11 with a sealing gasket 17 interposed therebetween, and the safety valve mechanism and the thermosensitive resistive element are provided inside the battery lid 14. Thus, the inside of the battery can 11 is tightly sealed. The battery lid 14 is made of, for example, a material similar to that of the battery can 11. The safety valve mechanism 15 is electrically connected to the battery lid 14. The safety valve mechanism 15 has a disk plate 15A that is inverted when the internal pressure of the battery is equal to or higher than a certain level due to internal short circuit or external heating, thus disconnecting the electrical connection between the battery lid 14 and the wound electrode body 20. The sealing gasket 17 is made of, for example, an insulating material, and asphalt is applied to the surface thereof.

A through hole 20A is provided at the center of the wound electrode body 20, and a center pin 24 is inserted into the through hole 20A. A positive electrode lead 25 made of aluminum (Al) or the like is connected to the positive electrode 21 of the wound electrode body 20, and a negative electrode lead 26 made of nickel or the like is connected to the negative electrode 22. The positive electrode lead 25 is welded to the safety valve mechanism 15 so as to be electrically connected to the battery lid 14, and the negative electrode lead 26 is welded to the battery can 11 so as to be electrically connected thereto.

In the battery according to the first embodiment, the open circuit voltage (i.e., the battery voltage) in a full charge state per pair of the positive electrode 21 and the negative electrode 22 may be 4.2 V or less, but may be designed so as to be higher than 4.2 V, preferably 4.25 V or more and 6.00 V or less, more preferably 4.3 V or more and 5.0 V or less, and still more preferably 4.35 V or more and 4.60 V or less. In the case where the open circuit voltage at the time of full charge is, for example, set to 4.25 V or more in a battery using a layered rock salt type lithium composite oxide or the like as the positive electrode active material, and even in the case of the same positive electrode active material, the amount of lithium released per unit mass increases as compared with a battery of 4.20 V, and a high energy density is obtained.

Hereinafter, the positive electrode 21, the negative electrode 22, the separator 23, and the electrolytic solution constituting the battery will be sequentially described.

Figure 2A:
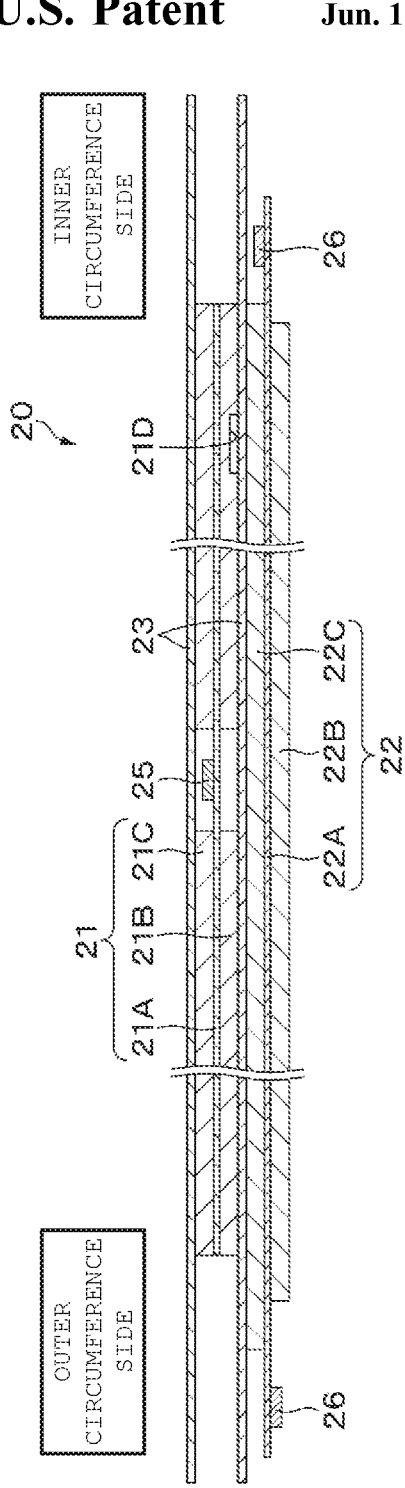
FIG. 2A is a cross-sectional view illustrating a configuration example of a wound electrode body in an unwound state.

As shown in FIG. 2A, the positive electrode 21 includes a positive electrode current collector 21A, a first positive electrode active material layer 21B provided on the inside surface of the positive electrode current collector 21A, and a second positive electrode active material layer 21C provided on the outside surface of the positive electrode current collector 21A. Here, the term "inside and outside" refers to the inside and outside of the positive electrode current collector 21A in a wound state. The positive electrode 21 has a positive electrode current collector exposed portion in which both sides of the positive electrode current collector 21A are exposed without being covered with the first and second positive electrode active material layers 21B and 21C, in the middle circumference portion. The positive electrode lead 25 is connected to the positive electrode current collector exposed portion.

Both sides of the positive electrode current collector 21A are covered with the first and second positive electrode active material layers 21B and 21C at the inner circumference side end portion and the outer circumference side end portion of the positive electrode 21. That is, the positive electrode 21 has a structure in which the positive electrode current collector 21A is not exposed at the inner circumference side end portion and the outer circumference side end portion of the positive electrode 21.

Figure 2B:
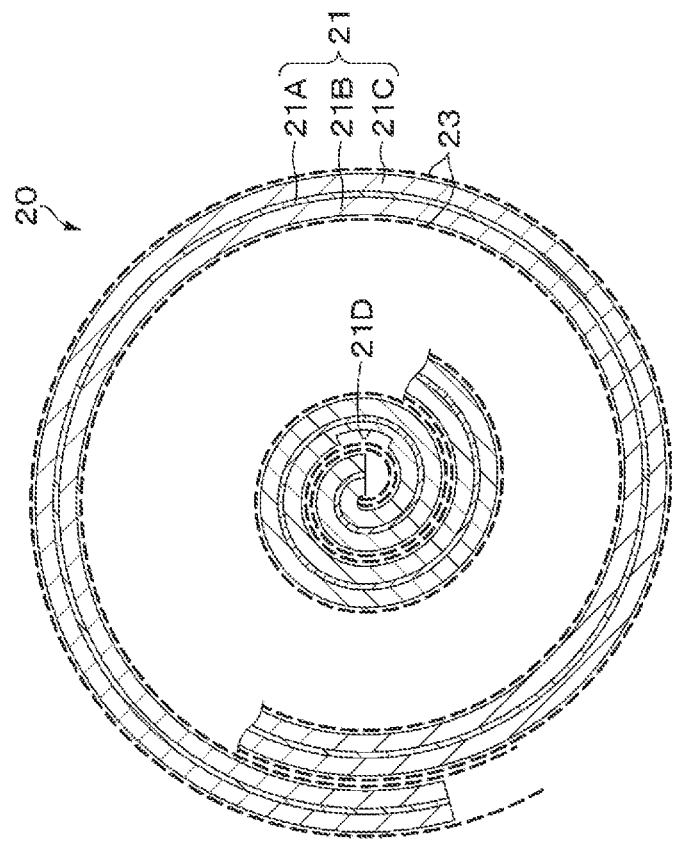
FIG. 2B is a cross-sectional view illustrating an example of a wound structure of a positive electrode according to an embodiment of the present technology.

As shown in FIGS. 2A and 2B, the first positive electrode active material layer 21B has locally a low area density portion 21D in a portion facing the inner circumference side end portion (tip end portion) of the positive electrode 21. In FIG. 2B, the illustration of the negative electrode 22 is omitted in order to facilitate understanding of the positional relationship between the inner circumference side end portion of the positive electrode 21 and the low area density portion 21D. The first positive electrode active material layer 21B has the low area density portion 21D so that it is possible to prevent the generation of a break in the positive electrode 21 at the portion facing the inner circumference side end portion of the positive electrode 21 during winding of the positive electrode 21.

Here, the low area density portion 21D has an area density lower than the average area density of the first positive electrode active material layer 21B. It is possible to confirm whether or not the positive electrode 21 has the low area density portion 21D in the following manner. In other words, it is possible to confirm whether or not the positive electrode 21 has the low area density portion 21D by obtaining cross-sectional Transmission Electron Microscope (TEM) images of the first positive electrode active material layer 21B at a portion facing the inner circumference side end portion of the positive electrode 21 and the first positive electrode active material layer 21B at a portion other than the above portion and comparing these cross-sectional TEM images.

FIGS. 2A and 2B show the configuration in which the surface of the low area density portion 21D has a recessed shape with respect to a surface of a portion other than the surface, but the configuration may be such that the surface of the low area density portion 21D has no recessed shape, and the thickness of the low area density portion 21D may be the same or substantially the same as the thickness of a portion other than the surface.

The effect of preventing the generation of a break in the positive electrode 21 by the low area density portion 21D is more remarkably exhibited when the pore diameter (diameter) of the through hole 20A is 3.0 mm or less. Here, the pore diameter of the through hole 20A means the width of the through hole 20A in a direction perpendicular to the center axis of a cylindrical wound electrode body 1. When the pore diameter of the through hole 20A varies depending on the direction, the pore diameter having the maximum value among the pore diameters of the through hole 20A is defined as a pore diameter of the through hole 20A.

The area density ratio $D_A/D_B$ between the area density $D_A$ of the low area density portion 21D of the first positive electrode active material layer 21B and the average area density $D_B$ of the first positive electrode active material layer 21B preferably satisfies the relationship of $D_A/D_B \leq 0.98$, and more preferably satisfies the relationship of $0.1 \leq D_A/D_B \leq 0.98$. When the area density ratio $D_A/D_B$ is greater than 0.98, the area density of the low area density portion 21D is too high, whereby the flexibility of the positive electrode 21 in the low area density portion 21D may decrease. On the other hand, when the area density ratio $D_A/D_B$ is less than 0.1, the area density of the low area density portion 21D is too low, whereby the positive electrode current collector 21A may be exposed at the low area density portion 21D during winding of the positive electrode 21.

The area density $D_A$ of the low area density portion 21D of the first positive electrode active material layer 21B is determined in the following manner. First, the battery is disassembled after being fully discharged, the positive electrode 21 is taken out, the battery is washed with a solvent (e.g., dimethyl carbonate (DMC)), and then sufficiently dried. Next, the second positive electrode active material layer 21C is removed using a nonwoven fabric impregnated with a solvent (e.g., N-methyl-2-pyrrolidone (NMP)). Then, the position of the low area density portion 21D of the positive electrode 21 from which the second positive electrode active material layer 21C is removed is confirmed by a cross-sectional TEM image or the like, a portion corresponding to the low area density portion 21D is cut out to produce a measurement sample (hereinafter, referred to as "measurement sample A"), and the mass of this measurement sample A (hereinafter, referred to as "mass MA1") is measured.

Next, the first positive electrode active material layer 21B of the measurement sample A is removed using a nonwoven fabric impregnated with a solvent or the like, and the mass (hereinafter, referred to as "mass MA2") and the area S (=(cutout length L)×(cutout width W)) are measured. The above measurement operation is performed on 100 batteries, the masses MA1, masses MA2, and areas S of the cut-out 100 batteries are simply averaged (arithmetically averaged), and the average value of the masses MA1, the average value of the masses MA2, and the average value of the areas S are obtained. Then, the (average) area density $D_A$ of the low area density portion 21D of the first positive electrode active material layer 21B is determined by the following formula:

Area density $D_A$ [mg/cm²]=((average value of mass $MA1$)−(average value of mass $MA2$))/(average value of area $S$ of measurement sample $A$)

The average area density $D_B$ of the first positive electrode active material layer 21B is determined in the following manner. Similarly to the method of determining the area density $D_A$, the positive electrode 21 from which the second positive electrode active material layer 21C is removed is produced and used as a measurement sample (hereinafter, referred to as "measurement sample B"), and the mass of the measurement sample B (hereinafter, referred to as "mass MB1") is measured. Next, the first positive electrode active material layer 21B of the measurement sample B is removed using a nonwoven fabric impregnated with a solvent or the like, and the mass (hereinafter, referred to as "mass MB2") is measured. Then, the average area density $D_B$ of the first positive electrode active material layer 21B is determined by the following formula:

Average area density $D_B$ [mg/cm²]=(mass $MB1$−mass $MB2$)/(area $S$ of measurement sample $B$ excluding positive electrode current collector exposed portion)

The positive electrode current collector 21A is made of, for example, a metal foil such as an aluminum foil, a nickel foil or a stainless steel foil. The first and second positive electrode active material layers 21B and 21C contain, for example, a positive electrode active material capable of occluding and releasing lithium which is an electrode reactant. The first and second positive electrode active material layers 21B and 21C may further contain an additive, if necessary. As the additive, for example, at least one of a conductive agent and a binder can be used.

As the positive electrode material capable of occluding and releasing lithium, for example, a lithium-containing compound such as a lithium oxide, a lithium phosphorus oxide, a lithium sulfide or an intercalation compound containing lithium is suitable, and two or more of these compounds may be mixed and used. In order to increase the energy density, a lithium-containing compound including lithium, a transition metal element, and oxygen (O) is preferred. Example of the lithium-containing compound include a lithium composite oxide having a layered rock salt type structure shown in the formula (A) and a lithium composite phosphate having an olivine type structure shown in the formula (B). The lithium-containing compound more preferably contains at least one selected from the group consisting of cobalt (Co), nickel, manganese (Mn), and iron as the transition metal element. As the lithium composite oxide containing Ni, for example, a lithium composite oxide (NCM) containing lithium, nickel, cobalt, manganese, and oxygen, or a lithium composite oxide (NCA) containing lithium, nickel, cobalt, aluminum, and oxygen may be used.

Examples of the lithium-containing compound as mentioned above include a lithium composite oxide having a layered rock salt type structure shown in the formula (C), (D) or (E), a lithium composite oxide having a spinel type structure shown in the formula (F), and a lithium composite phosphate having an olivine type structure shown in the formula (G). Specific examples the lithium-containing compound include $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), and $Li_eFePO_4$ (e≈1).

$$Li_pNi_{(1-q-r)}Mn_qM1_rO_{(2-y)}X_z \qquad (A)$$

(In the formula (A), M1 represents at least one of elements selected from Group 2 to Group 15 excluding nickel and manganese. X represents at least one of elements of Group 16 and Group 17 other than oxygen. p, q, y, and z are values within ranges of $0 \leq p \leq 1.5$, $0 \leq q \leq 1.0$, $0 \leq r \leq 1.0$, $-0.10 \leq y \leq 0.20$, and $0 \leq z \leq 0.2$.)

$$Li_aM2_bPO_4 \qquad (B)$$

(In the formula (B), M2 represents at least one of elements selected from Group 2 to Group 15. a and b are values within ranges of $0 \leq a \leq 2.0$ and $0.5 \leq b \leq 2.0$.)

$$Li_jMn_{(1-g-h)}Ni_gM3_hO_{(2-j)}F_k \qquad (C)$$

(In the formula (C), M3 represents at least one of the group consisting of cobalt, magnesium (Mg), aluminum, boron (B), titanium (Ti), vanadium (V), chromium (Cr), iron, copper (Cu), zinc (Zn), zirconium (Zr), molybdenum (Mo), tin (Sn), calcium (Ca), strontium (Sr), and tungsten (W). f, g, h, j, and k are within ranges of $0.8 \leq f \leq 1.2$, $0 < g < 0.5$, $0 \leq h \leq 0.5$, g+h<1, $-0.1 \leq j \leq 0.2$, and $0 \leq k \leq 0.1$.

However, the composition of lithium varies depending on the charge/discharge state, and the value off indicates the value in a full discharge state.)

$$Li_mNi_{(1-n)}M4_nO_{(2-p)}F_q \qquad (D)$$

(in the formula (D), M4 represents at least one of the group consisting of cobalt, manganese, magnesium, aluminum, boron, titanium, vanadium, chromium, iron, copper, zinc, molybdenum, tin, calcium, strontium, and tungsten. m, n, p, and q are values within ranges of $0.8 \leq m \leq 1.2$, $0.005 \leq n \leq 0.5$, $-0.1 \leq p \leq 0.2$, and $0 \leq q \leq 0.1$. The composition of lithium varies depending on the charge/discharge state, and the value of m indicates the value in a full discharge state.)

$$Li_rCo_{(1-s)}M5_sO_{(2-t)}F_u \qquad (E)$$

(in the formula (E), M5 represents at least one of the group consisting of nickel, manganese, magnesium, aluminum, boron, titanium, vanadium, chromium, iron, copper, zinc, molybdenum, tin, calcium, strontium, and tungsten. r, s, t, and u are values within ranges of $0.8 \leq r \leq 1.2$, $0 \leq s < 0.5$, $-0.1 \leq t \leq 0.2$, and $0 \leq u \leq 0.1$. However, the composition of lithium varies depending on the charge/discharge state, and the value of r indicates the value in a full discharge state.)

$$Li_vMn_{2-w}M6_wO_xF_y \qquad (F)$$

(In the formula (F), M6 represents at least one of the group consisting of cobalt, nickel, magnesium, aluminum, boron, titanium, vanadium, chromium, iron, copper, zinc, molybdenum, tin, calcium, strontium, and tungsten. v, w, x, and y are values within ranges of $0.9 \leq v \leq 1.1$, $0 \leq w \leq 0.6$, $3.7 \leq x \leq 4.1$, and $0 \leq y \leq 0.1$.

However, the composition of lithium varies depending on the charge/discharge state, and the value of v indicates the value in a full discharge state.)

$$Li_zM7PO_4 \qquad (G)$$

(In the formula (G), M7 represents at least one of the group consisting of cobalt, manganese, iron, nickel, magnesium, aluminum, boron, titanium, vanadium, niobium (Nb), copper, zinc, molybdenum, calcium, strontium, tungsten, and zirconium. z is a value within a range of $0.9 \leq z \leq 1.1$. However, the composition of lithium varies depending on the charge/discharge state, and the value of z indicates the value in a full discharge state.)

Other examples of the positive electrode material capable of occluding and releasing lithium include inorganic compounds containing no lithium, such as $MnO_2$, $V_2O_5$, $V_6O_{13}$, NiS, and MoS.

The positive electrode material capable of occluding and releasing lithium may be other than the above. Further, two or more kinds of positive electrode materials exemplified above may be mixed in arbitrary combination.

As the binder, for example, at least one selected from resin materials such as polyvinylidene fluoride (PVdF), polytetrafluoroethylene (PTFE), polyacrylonitrile (PAN), styrene butadiene rubber (SBR), carboxymethyl cellulose (CMC), and copolymers mainly formed of these resin materials is used.

Examples of the conductive agent include carbon materials such as graphite, carbon black, and ketjen black, and one or two or more kinds thereof are used in mixture. Besides the carbon materials, a metal material, a conductive polymer material, or the like may be used as long as the material has conductivity.

As shown in FIG. 2A, the negative electrode 22 includes a negative electrode current collector 22A, a first negative electrode active material layer 22B provided on the inside surface of the negative electrode current collector 22A, and a second negative electrode active material layer 22C provided on the outside surface of the negative electrode current collector 22A. Here, the term "inside" and "outside" respectively refer to the inside and outside of the negative electrode current collector 22A in a wound state.

The negative electrode 22 has a negative electrode current collector exposed portion in which the negative electrode current collector 22A is exposed without being covered with the first and second negative electrode active material layers 22B and 22C, at both ends at the inner circumference side and the outer circumference side. The negative electrode lead 26 is connected to the negative electrode current collector exposed portion.

The negative electrode current collector 22A is made of, for example, a metal foil such as a copper foil, a nickel foil, or a stainless steel foil.

The first and second negative electrode active material layers 22B and 22C contain one or two or more kinds of negative electrode active materials capable of occluding and releasing lithium. The first and second negative electrode active material layers 22B and 22C may further contain additives such as a binder and a conductive agent, if necessary.

In this nonaqueous electrolyte battery, it is preferable that the electrochemical equivalent of the negative electrode 54 or the negative electrode active material is larger than the electrochemical equivalent of the positive electrode 21, and theoretically, a lithium metal is not deposited on the negative electrode 22 during charging.

Examples of the negative electrode active material include non-graphitizable carbon, graphitizable carbon, graphite, pyrolytic carbons, cokes, glassy carbons, organic polymer compound fired bodies, and carbon materials such as carbon fiber or activated carbon. Among these materials, cokes are, for example, pitch cokes, needle cokes, or petroleum cokes. The term "organic polymer compound fired body" means a fired body obtained by firing a polymer material such as a phenol resin or a furan resin at an appropriate temperature and carbonizing the resultant material, and some of the fired bodies are classified into non-graphitizable carbon or graphitizable carbon. These carbon materials are preferable because very little change occurs in the crystal structure generated during charging/discharging, a high charge/discharge capacity can be obtained, and good cycle characteristics can be obtained. In particular, graphite is preferable because it has a large electrochemical equivalent and is able to obtain a high energy density. Further, non-graphitizable carbon is preferable because excellent cycle characteristics can be obtained. Furthermore, a carbon material having a low charge-discharge potential, specifically a carbon material having a charge-discharge potential close to that of lithium metal is preferable because a high energy density of the battery is easily realized.

Further, examples of another negative electrode active material capable of increasing the capacity include a material that contains at least one of a metal element and a metalloid element as a constituent element (e.g., an alloy, a compound, or a mixture). This is because a high energy density can be achieved when such a material is used. Particularly, it is more preferable to use such a material together with a carbon material because a high energy density and excellent cycle characteristics can be achieved. In the present technology, the term "alloy" includes alloys containing two or more kinds of metal elements and also alloys containing one or more kinds of metal elements and one or more kinds of metalloid elements. Further, these alloys may also contain a non-metal element. Tissues of these alloys include a solid solution, a eutectic crystal (eutectic mixture) or an intermetallic compound, and two or more thereof may coexist.

Examples of the negative electrode active material include a metal element or a metalloid element capable of forming an alloy with lithium. Specific examples thereof include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium (Y), palladium (Pd), and platinum (Pt). These metal and metalloid elements may be crystalline or amorphous.

The negative electrode active material preferably contains a metal element or a metalloid element of Group 4B in the short period periodic table as a constituent element, and more preferably contains at least one of silicon and tin as a constituent element. This is because silicon and tin have a large capability capable of occluding and releasing lithium, and can obtain a high energy density. Examples of the negative electrode active material include a simple substance, an alloy or a compound of silicon, a simple substance, an alloy or a compound of tin, and a material including at least a part of a phase including one or two or more kinds thereof.

Examples of the alloy of silicon include an alloy containing at least one of the group consisting of tin, nickel, copper, iron, cobalt, manganese, zinc, indium, silver, titanium, germanium, bismuth, antimony (Sb), and chromium as a second constituent element other than silicon. Examples of the alloy of tin include an alloy containing at least one of the group consisting of silicon, nickel, copper, iron, cobalt, manganese, zinc, indium, silver, titanium, germanium, bismuth, antimony, and chromium as the second constituent element other than tin.

Examples of the compound of tin or the compound of silicon include compounds containing oxygen or carbon, and the compound of tin or the compound of silicon may contain the above-mentioned second constituent element in addition to tin or silicon.

Among these materials, a SnCoC-containing material which contains cobalt, tin, and carbon as constituent elements and in which the content of carbon is 9.9 mass % or more and 29.7 mass % or less and the proportion of cobalt to the total of tin and cobalt is 30 mass % or more and 70 mass % or less, is preferable as the Sn-based negative electrode active material. This is because a high energy density and excellent cycle characteristics can be achieved in such a composition range.

This SnCoC-containing material may further contain other constituent elements, if necessary. As other constituent elements, for example, silicon, iron, nickel, chromium, indium, niobium, germanium, titanium, molybdenum, aluminum, phosphorus (P), gallium, and bismuth are preferred, and two or more kinds thereof may be contained. This is because the capacity or cycle characteristics can be further improved.

This SnCoC-containing material has a phase containing tin, cobalt, and carbon, and this phase preferably has a low crystalline or amorphous structure. Further, in the SnCoC-containing material, the carbon as a constituent element is preferably at least partially bonded to a metal element or a metalloid element which is another constituent element. This is because the cycle characteristics may be lowered due to aggregation or crystallization of tin or the like, and carbon is bound to other elements, making it possible to suppress such aggregation or crystallization.

Examples of measurement methods for examining the bonding state of elements include X-ray photoelectron spectroscopy (XPS). In this XPS, so far as graphite is concerned, a peak of the 1s orbit of carbon (C1s) appears at 284.5 eV in an energy-calibrated apparatus such that a peak of the 4f orbit of a gold atom (Au4f) is obtained at 84.0 eV. Also, so far as surface-contaminated carbon is concerned, the peak appears at 284.8 eV. On the other hand, when a charge density of the carbon element is high, for example, when carbon is bonded to a metal element or a metalloid element, the peak of C1s appears in a region lower than 284.5 eV. That is, when a peak of a combined wave of C1s obtained on the SnCoC-containing material appears in a region lower than 284.5 eV, at least a part of carbon contained in the SnCoC-containing material is bonded to a metal element or a metalloid element as another constituent element.

In the XPS measurement, for example, the peak of C1s is used for correcting the energy axis of a spectrum. Usually, since surface-contaminated carbon is present on the surface, the peak of C1s of the surface-contaminated carbon is fixed at 284.8 eV, and this peak is used as an energy reference. In the XPS measurement, a waveform of the peak of C1s is obtained as a form including the peak of the surface-contaminated carbon and the peak of the carbon in the SnCoC-containing material, so the peak of the surface-contaminated carbon and the peak of the carbon in the SnCoC-containing material are separated by, for example, analysis with use of commercially available software. In the analysis of the waveform, the position of the main peak present on the lowest binding energy side is determined to be an energy reference (284.8 eV).

Examples of other negative electrode active materials include metal oxides and polymer compounds, each of which is capable of occluding and releasing lithium. Examples of the metal oxides include lithium titanium oxide containing titanium and lithium such as lithium titanate ($Li_4Ti_5O_{12}$), iron oxide, ruthenium oxide, and molybdenum oxide. Examples of the polymer compounds include polyacetylene, polyaniline, and polypyrrole.

As the binder, for example, at least one selected from resin materials such as polyvinylidene fluoride, polytetrafluoroethylene, polyacrylonitrile, styrene butadiene rubber, carboxymethyl cellulose, and copolymers mainly formed of these resin materials is used. As the conductive agent, a carbon material similar to the first and second positive electrode active material layers 21B and 21C can be used.

The inner circumference side end portion of the separator 23 is wound longer than the inner circumference side end portion of the positive electrode 21. On the other hand, the outer circumference side end portion of the separator 23 is wound longer than the outer circumference side end portion of the positive electrode 21. The separator 23 separates the positive electrode 21 and the negative electrode 22, and allows lithium ions to pass while preventing a short circuit of the current caused by the contact between both the electrodes.

The separator 23 is constituted by a porous membrane made of a resin such as polytetrafluoroethylene, polypropylene or polyethylene, and may have a structure in which two or more of these porous membranes are laminated. Above all, a polyolefin porous membrane is preferable because of having an excellent short circuit prevention effect and intending to improve the safety of the battery due to the shutdown effect. In particular, polyethylene is preferable as a material constituting the separator 23 because polyethylene can obtain shutdown effects in the range of 100° C. or more and 160° C. or less and is also excellent in electrochemical stability. In addition, a material obtained by copolymerizing or blending a resin having chemical stability with polyethylene or polypropylene can be used. Alternatively, the porous membrane may have a structure of three or more layers in which a polypropylene layer, a polyethylene layer, and a polypropylene layer are sequentially laminated.

Further, in the separator 23, a resin layer may be provided on one side or both sides of the porous membrane which is a base material. The resin layer is a porous matrix resin layer on which an inorganic substance is supported. With this arrangement, it is possible to obtain oxidation resistance and to suppress deterioration of the separator 23. For example, polyvinylidene fluoride, hexafluoropropylene (HFP), polytetrafluoroethylene or the like can be used as the matrix resin, and a copolymer thereof can also be used.

Examples of the inorganic substance include a metal, a semiconductor, or an oxide or nitride thereof. Examples of the metal include aluminum and titanium, and examples of the semiconductor include silicon and boron. In addition, it is preferable that the inorganic substance does not substantially have conductivity and has a large heat capacity. This is because in the case where the heat capacity is large, the inorganic substance is useful as a heatsink at the time of generating the heat of a current and is capable of suppressing a thermal runaway of a battery. Examples of the inorganic substance include an oxide or nitride, such as alumina ($Al_2O_3$), boehmite (monohydrate of alumina), talc, boron nitride (BN), aluminum nitride (AlN), titanium dioxide ($TiO_2$), and silicon oxide (SiOx).

The particle size of the inorganic substance is preferably in a range of 1 nm to 10 μm. In the case where the particle size is less than 1 nm, it is hard to obtain the inorganic substance, or it is not suitable in cost even in the case where the inorganic substance can be obtained. In the case where the particle size is greater than 10 μm, a distance between the electrodes increases, the filling amount of an active material is not sufficiently obtained in a limited space, and the battery capacity becomes low.

As a method of forming the resin layer, for example, the resin layer can be formed by applying a slurry composed of a matrix resin, a solvent, and an inorganic material to a base material (porous membrane), and allowing the coated base material to pass through a poor solvent of the matrix resin and a bath compatible with the above-described solvent, thereby causing phase separation, and then drying it.

The piercing strength of the separator 23 is preferably in the range of 100 gf to 1000 gf. The piercing strength is more preferably in the range of 100 gf to 480 gf. This is because when the piercing strength is too low, a short circuit may be caused, whereas when it is too high, the ionic conductivity is lowered.

The air permeability of the separator 23 is preferably in the range of 30 sec/100 cc to 1000 sec/100 cc. The air permeability is more preferably in the range of 30 sec/100 cc to 680 sec/100 cc. This is because when the air permeability is too low, a short circuit may be caused, whereas the air permeability is too high, the ion conductivity is lowered.

It is to be noted that the above-mentioned inorganic substance may be contained in the porous membrane as the base material.

The electrolytic solution with which the first and second positive electrode active material layers 21B and 21C, the first and second negative electrode active material layers 22B and 22C, and the separator 23 are impregnated contains a solvent and an electrolyte salt dissolved in the solvent. In order to improve the battery characteristics, the electrolytic solution may contain known additives.

As the solvent, a cyclic carbonate such as ethylene carbonate or propylene carbonate can be used, and it is preferable to use one of ethylene carbonate and propylene carbonate, particularly a mixture of both of them. This is because cycle characteristics can be improved.

In addition to these cyclic carbonates, as the solvent, a chain carbonate such as diethyl carbonate, dimethyl carbonate, ethyl methyl carbonate, or methyl propyl carbonate is preferably mixed and used. This is because high ionic conductivity can be obtained.

Furthermore, it is preferable that the solvent further contains 2,4-difluoroanisole or vinylene carbonate. This is because 2,4-difluoroanisole can improve discharge capacity and vinylene carbonate can improve cycle characteristics. Accordingly, these are mixed and used so that the discharge capacity and cycle characteristics can be improved, and this is preferable.

Other than these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropyronitrile, N, N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

A compound obtained by substituting fluorine for at least a part of hydrogen of any of these nonaqueous solvents may be preferable because the reversibility of the electrode reaction may be improved depending on kinds of electrodes used as a combination.

Examples of the electrolyte salt include lithium salts, and the lithium salts may be used singly, or in mixture of two or more kinds thereof. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalateborate, and LiBr. Above all, $LiPF_6$ is preferable because it can obtain high ionic conductivity and can improve cycle characteristics.

In the battery having the above-mentioned configuration, when the battery is charged, for example, lithium ions are released from the first and second positive electrode active material layers 21B and 21C, and occluded in the first and second negative electrode active material layers 22B and 22C via the electrolytic solution with which the separator 23 is impregnated. Further, when the battery is discharged, for example, lithium ions are released from the first and second negative electrode active material layers 22B and 22C, and occluded in the first and second positive electrode active material layers 21B and 21C via the electrolytic solution with which the separator 23 is impregnated.

Subsequently, an example of the method of manufacturing a battery according to the first embodiment of the present technology will be described.

First, for example, a positive electrode mixture is prepared by mixing a positive electrode active material, a conductive agent, and a binder, and this positive electrode mixture is dispersed in a solvent such as N-methyl-2-pyrrolidone (NMP), to prepare a paste-like positive electrode mixture slurry. Next, the positive electrode mixture slurry is applied to both sides of the positive electrode current collector 21A, the solvent is dried, and compression-molded by a roll press machine or the like to form the first and second positive electrode active material layers 21B and 21C, thereby forming the positive electrode 21. At this time, the low area density portion 21D is formed in the first positive electrode active material layer 21B so that the low area density portion 21D is located at the position of one circumferential outer side from the winding start end portion of the positive electrode 21 during winding of the positive electrode 21.

Further, for example, a negative electrode mixture is prepared by mixing a negative electrode active material and a binder, and this negative electrode mixture is dispersed in a solvent such as N-methyl-2-pyrrolidone to prepare a paste-like negative electrode mixture slurry. Next, the negative electrode mixture slurry is applied to both sides of the negative electrode current collector 22A, the solvent is dried, compression-molded by a roll press machine or the like to form the first and second negative electrode active material layers 22B and 22C, thereby forming the negative electrode 22.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound with the separator 23 interposed therebetween. Next, the tip end portion of the positive electrode lead 25 is welded to the safety valve mechanism 15, the tip end portion of the negative electrode lead 26 is welded to the battery can 11, and the wound positive electrode 21 and the wound negative electrode 22 are sandwiched between the pair of insulating plates 12 and 13 and housed in the battery can 11. Next, after the positive electrode 21 and the negative electrode 22 are housed in the battery can 11, an electrolytic solution is injected into the battery can 11, and the separator 23 is impregnated with the electrolytic solution. Next, the battery lid 14, the safety valve mechanism 15, and the thermosensitive resistive element 16 are fixed to the opening end of the battery can 11 by caulking through the sealing gasket 17. Thus, the battery shown in FIG. 1 is obtained.

In the battery according to the first embodiment, the positive electrode 21 has the low area density portion 21D locally provided on the position of one circumferential outer side from one end (tip end) of the inner circumference side of the positive electrode 21. As a result, even if the surface densities of the first and second positive electrode active material layers 21B and 21C are increased for higher capacity, it is possible to ensure the flexibility of the positive electrode 21 on the position of one circumferential outer side from one end of the inner circumference side of the positive electrode 21. Therefore, when the wound electrode body 20 is produced, it is possible to prevent the generation of a break in the positive electrode 21 on the position of one circumferential outer side from one end of the inner circumference side of the positive electrode 21.

Figure 3A:
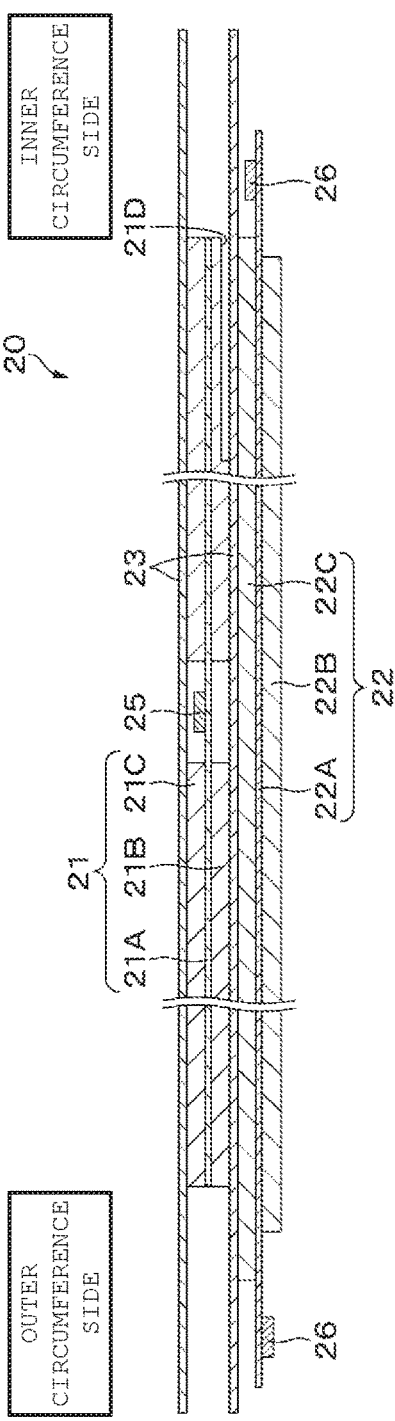
FIG. 3A is a cross-sectional view illustrating a configuration example of a wound electrode body in an unwound state.
Figure 3B:
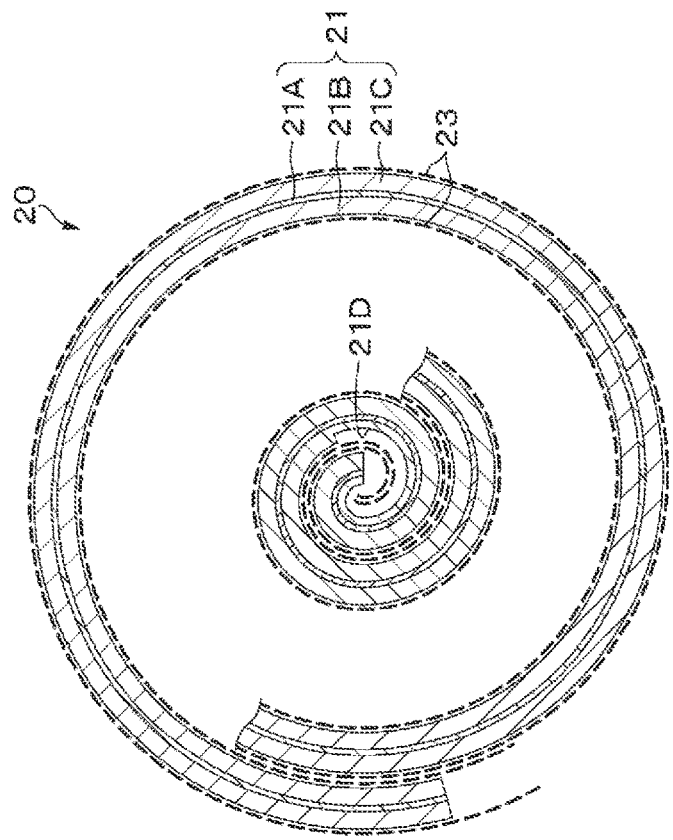
FIG. 3B is a cross-sectional view illustrating an example of a wound structure of a positive electrode according to an embodiment of the present technology.

As shown in FIGS. 3A and 3B, the low area density portion 21D may be continuously provided over a range exceeding one circumference from the inner circumference side end portion (tip end) of the positive electrode 21. In this case, a step difference at the inner circumference side end portion of the positive electrode 21 is reduced, so that a damage on the separator 23 can be suppressed by the inner circumference side end portion of the positive electrode 21 when an impact is applied to the battery due to dropping or the like. Therefore, in addition to the above-described effect of preventing the generation of a break in the positive electrode 21, it is also possible to obtain an effect of suppressing the occurrence of a short circuit in the inner circumference portion of the wound electrode body 20.

The area density ratio $D_A/D_B$ between the area density DA of the low area density portion 21D of the first positive electrode active material layer 21B and the average area density DB of the first positive electrode active material layer 21B preferably satisfies the relationship of $D_A/D_B \leq 0.98$, and more preferably satisfies the relationship of $0.1 \leq D_A/D_B \leq 0.98$. When the area density ratio $D_A/D_B$ is greater than 0.98, the area density of the low area density portion 21D is too high, whereby the flexibility of the positive electrode 21 in the low area density portion 21D may decrease. Further, the area density of the low area density portion 21D is too high, whereby the reduction of the step difference at the inner circumference side end portion of the positive electrode 21 may become insufficient. Therefore, when an impact is applied to the battery due to dropping or the like, the damage applied to the separator 23 may not be sufficiently suppressed by the inner circumference side end portion of the positive electrode 21. On the other hand, when the area density ratio $D_A/D_B$ is less than 0.1, the area density of the low area density portion 21D is too low, whereby the positive electrode current collector 21A may be exposed at the low area density portion 21D during winding of the positive electrode 21.

The low area density portion 21D may be locally provided at two positions, i.e., the inner circumference side end portion of the positive electrode 21 and the position of one circumferential outer side from one end (tip end) of the inner circumference side of the positive electrode 21. Also in this case, the effect similar to the above can be obtained.

Figure 4A:
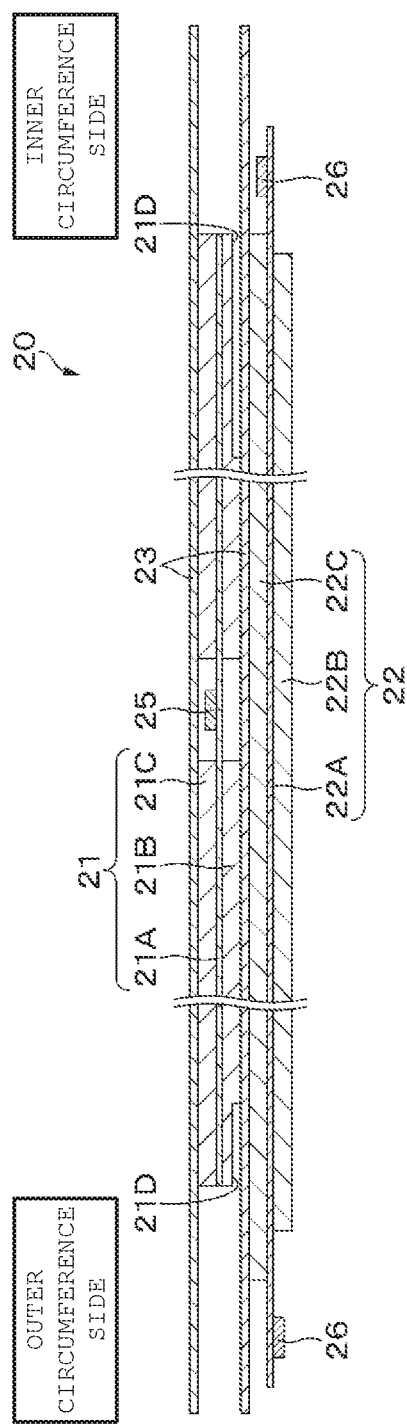
FIG. 4A is a cross-sectional view illustrating a configuration example of a wound electrode body in an unwound state.
Figure 4B:
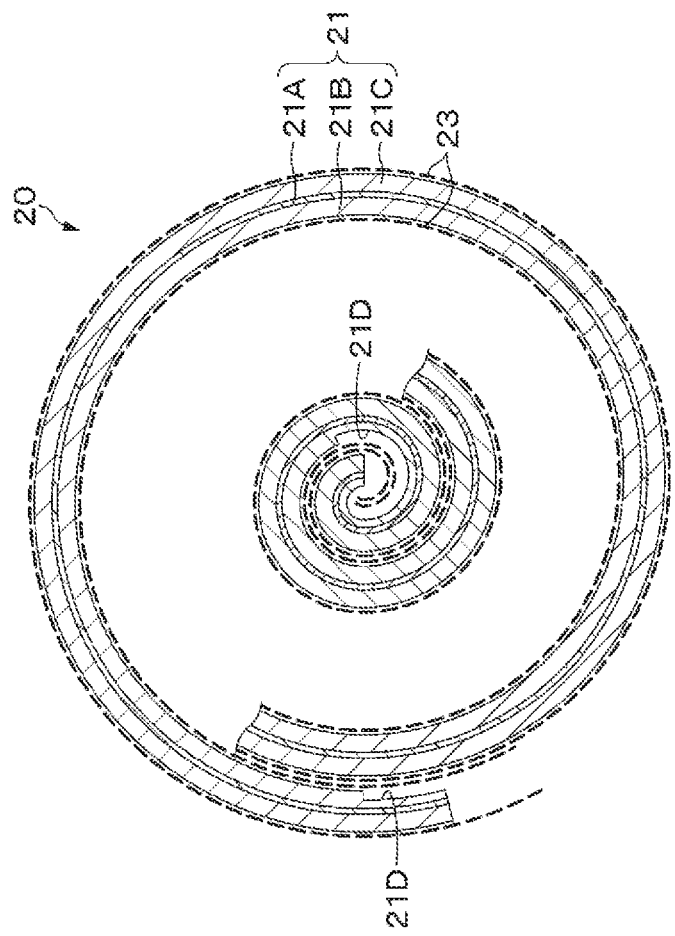
FIG. 4B is a cross-sectional view illustrating an example of a wound structure of a positive electrode according to an embodiment of the present technology.

As shown in FIGS. 4A and 4B, the first positive electrode active material layer 21B may further have the low area density portion 21D at the outer circumference side end portion of the positive electrode 21. In this case, a step difference at the outer circumference side end portion of the positive electrode 21 is reduced, so that a damage on the separator 23 can be suppressed by the outer circumference side end portion of the positive electrode 21 when an impact is applied to the battery due to dropping or the like. Therefore, it is possible to suppress the occurrence of a short circuit at the outer circumference portion of the wound electrode body 20.

The area density ratio $D_C/D_B$ between the area density $D_C$ of the low area density portion 21D at the outer circumference side end portion of the first positive electrode active material layer 21B and the average area density $D_B$ of the first positive electrode active material layer 21B preferably satisfies the relationship of $D_C/D_B \leq 0.98$, and more preferably satisfies the relationship of $0.1 \leq D_C/D_B \leq 0.98$. When the area density ratio $D_C/D_B$ is greater than 0.98, the area density of the low area density portion 21D is too high, whereby the reduction of the step difference at the outer circumference side end portion of the positive electrode 21 may become insufficient. Therefore, when an impact is applied to the battery due to dropping or the like, the damage applied to the separator 23 may not be sufficiently suppressed by the outer circumference side end portion of the positive electrode 21. On the other hand, when the area density ratio $D_C/D_B$ is less than 0.1, the area density of the low area density portion 21D is too low, whereby the positive electrode current collector 21A may be exposed at the low area density portion 21D during winding of the positive electrode 21.

The area density $D_C$ of the low area density portion 21D in the outer circumference side end portion of the first positive electrode active material layer 21B is determined in the following manner. Similarly to the method of determining the area density $D_A$, the positive electrode 21 from which the second positive electrode active material layer 21C is removed is first produced. Then, the position of the low area density portion 21D of the positive electrode 21 from which the second positive electrode active material layer 21C is removed is confirmed by a cross-sectional TEM image or the like, a portion corresponding to the low area density portion 21D is cut out from the outer circumference side (winding end side) to produce a measurement sample (hereinafter, referred to as "measurement sample C"), and the mass of this measurement sample C (hereinafter, referred to as "mass MC1") is measured.

Next, the first positive electrode active material layer 21B of the measurement sample C is removed using a nonwoven fabric impregnated with a solvent or the like, and the mass (hereinafter, referred to as "mass MC2") and the area S (=(cutout length L)×(cutout width W)) are measured. The above measurement operation is performed on 100 batteries, the masses MC1, masses MC2, and areas S of the cut-out 100 batteries are simply averaged (arithmetically averaged), and the average value of the masses MC1, the average value of the masses MC2, and the average value of the areas S are obtained. Then, the (average) area density DC of the outer circumference side end portion of the first positive electrode active material layer 21B is determined by the following formula:

Area density $D_C$ [mg/cm$^2$]=((average value of mass MC1)−(average value of mass MC2))/(average value of area $S$ of measurement sample $C$)

FIGS. 4A and 4B show the configuration in which the first positive electrode active material layer 21B has the low area density portions 21D at both end portions on the inner circumference side and the outer circumference side of the positive electrode 21, however, the configuration in which the first positive electrode active material layer 21B has the low area density portion 21D only on the outer circumference side end portion of the positive electrode 21 may be employed.

Figure 5A:
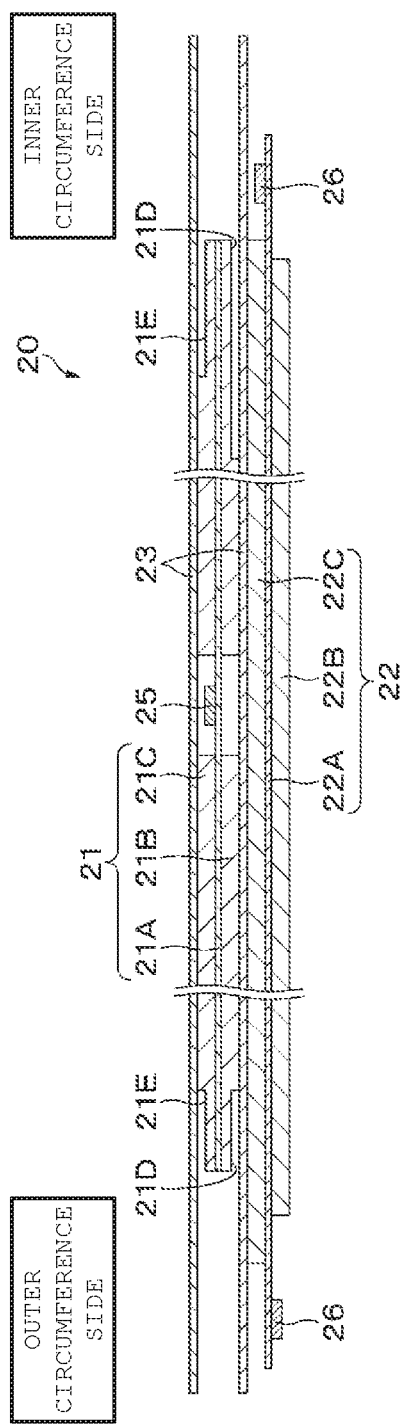
FIG. 5A is a cross-sectional view illustrating a configuration example of a wound electrode body in an unwound state.
Figure 5B:
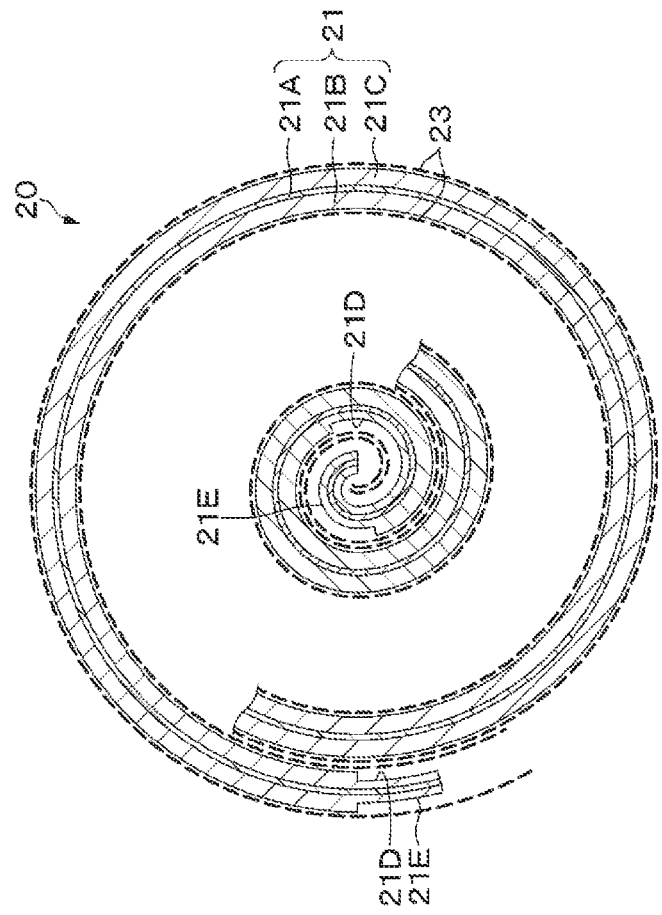
FIG. 5B is a cross-sectional view illustrating an example of a wound structure of a positive electrode according to an embodiment of the present technology.

As shown in FIGS. 5A and 5B, the second positive electrode active material layer 21C may further have a low area density portion 21E at both end portions on the inner circumference side and the outer circumference side of the positive electrode 21. In this case, a step difference at both end portions on the inner circumference side and the outer circumference side of the positive electrode 21 is further reduced, so that a damage on the separator 23 can be further suppressed by the both end portions on the inner circumference side and the outer circumference side of the positive electrode 21 when an impact is applied to the battery due to dropping or the like. Therefore, it is possible to further suppress the occurrence of a short circuit at the inner circumference portion and the outer circumference portion of the wound electrode body 20.

Here, the low area density portion 21E has an area density lower than the average area density of the second positive electrode active material layer 21C. From the viewpoint of suppressing the damage of the separator 23 when an impact is applied to the battery due to dropping or the like, the low area density portion 21D preferably has a recessed shape.

The area density ratio $D_D/D_E$ between the area density $D_D$ of the low area density portion 21E in the inner circumference side end portion of the second positive electrode active material layer 21C and the average area density $D_E$ of the second positive electrode active material layer 21C preferably satisfies the relationship of $D_D/D_E \leq 0.98$, and more preferably satisfies the relationship of $0.1 \leq D_D/D_E \leq 0.98$.

The area density ratio $D_F/D_E$ between the area density $D_F$ of the low area density portion 21E in the outer circumference side end portion of the second positive electrode active material layer 21C and the average area density $D_E$ of the second positive electrode active material layer 21C preferably satisfies the relationship of $D_F/D_E \leq 0.98$, and more preferably satisfies the relationship of $0.1 \leq D_F/D_E \leq 0.98$.

The area density $D_D$ is determined in the same manner as in the method of obtaining the area density $D_C$ except that a portion corresponding to the low area density portion 21E is cut out from the inner circumference side end portion of the positive electrode 21 from which the first positive electrode active material layer 21B is removed to produce a measurement sample. The average area density $D_E$ is obtained in the same manner as in the method of obtaining the average area density $D_B$ except that the positive electrode 21 from which the first positive electrode active material layer 21B is removed is produced and used as a measurement sample. The area density $D_F$ is determined in the same manner as in the method of obtaining the area density $D_C$ except that a portion corresponding to the low area density portion 21E is cut out from the outer circumference side end portion of the positive electrode 21 from which the first positive electrode active material layer 21B is removed to produce a measurement sample.

FIGS. 5A and 5B show the configuration in which the low area density portions 21E are provided at both end portions on the inner circumference side and the outer circumference side of the positive electrode 21, however, the low area density portion 21E may be provided at one of the both end portions on the inner circumference side and the outer circumference side of the positive electrode 21. However, from the viewpoint of suppressing the occurrence of a short circuit in both the inner circumference portion and the outer circumference portion of the wound electrode body 20, it is preferable to employ a configuration having the low area density portion 21E at both end portions on the inner circumference side and the outer circumference side of the positive electrode 21.

FIGS. 5A and 5B show the configuration in which the positive electrode 21 has both the low area density portions 21D and 21E on the inner circumference portion, however, a configuration in which the positive electrode 21 has one of the low area density portions 21D and 21E on the inner circumference portion may be employed. However, from the viewpoint of suppressing the occurrence of a short circuit in the inner circumference portion of the wound electrode body 20, it is preferable to employ a configuration in which the positive electrode 21 has both of the low area density portions 21D and 21E on the inner circumference portion.

FIGS. 5A and 5B show the configuration in which the positive electrode 21 has both of the low area density portions 21D and 21E on the outer circumference portion, however, a configuration in which the positive electrode 21 has one of the low area density portions 21D and 21E on the outer circumference portion may be employed. However, from the viewpoint of suppressing the occurrence of a short circuit in the outer circumference portion of the wound electrode body 20, it is preferable to employ a configuration in which the positive electrode 21 has both the low area density portions 21D and 21E on the outer circumference portion.

In the above-mentioned first embodiment, the example in which the present technology is applied to the positive electrode has been described, however, the present technology may be applied to the negative electrode, or the present technology may be applied to both the positive electrode and the negative electrode.

In the above-mentioned first embodiment, the example in which the present technology is applied to the lithium ion secondary battery has been described, however, the present technology can also be applied to a secondary battery other than the lithium ion secondary battery and a primary battery. However, it is particularly effective to apply the present technology to the lithium ion secondary battery.

In the above-mentioned first embodiment, the example in which the present technology is applied to the cylindrical battery has been described, however, the present technology may be applied to a prismatic or flat battery.

In the above-mentioned first embodiment, the case where an exterior member housing the wound electrode body is a battery can has been described as an example, however, the exterior member may be a flexible exterior member such as a laminate film.

In the above-mentioned first embodiment, the case where the electrolyte is an electrolytic solution has been described as an example, and the electrolyte may be an electrolyte obtained by swelling a polymer compound with an electrolytic solution (e.g., a gel electrolyte), a solid electrolyte or a combination thereof.

In a second embodiment, a battery pack and an electronic device, including the battery according to the first embodiment or the modified example thereof, will be described.

Figure 6:
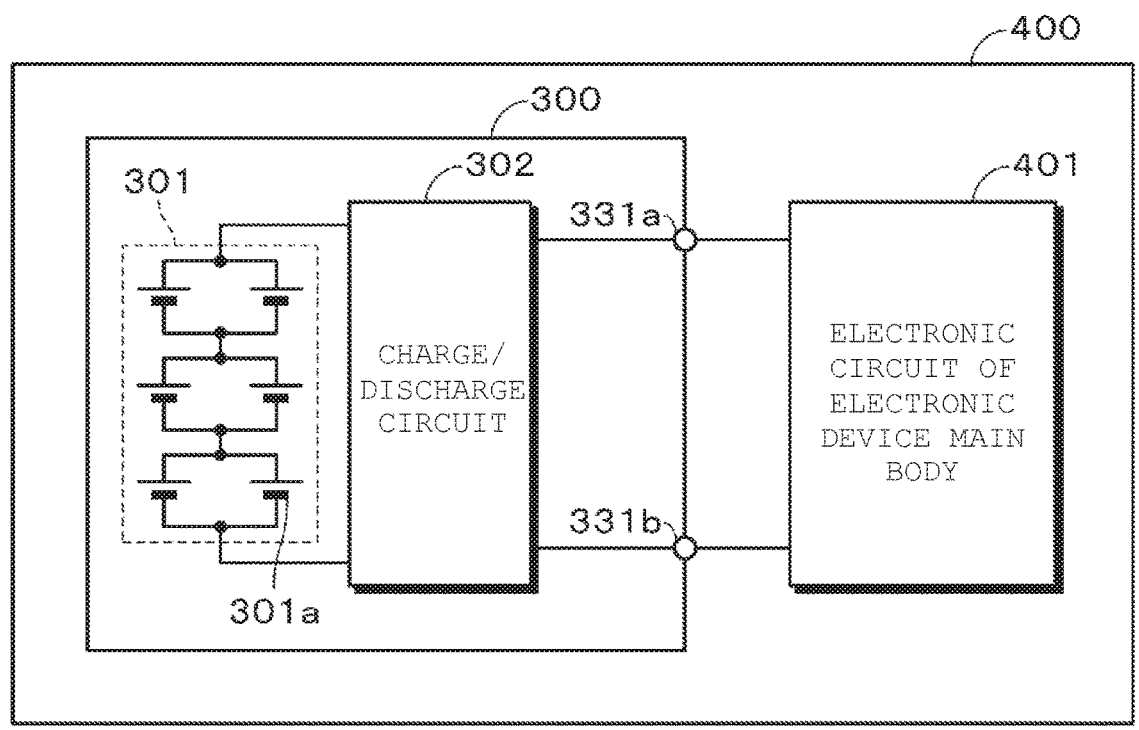
FIG. 6 is a block diagram illustrating a configuration example of an electronic device according to an embodiment of the present technology.

Hereinafter, a configuration example of a battery pack 300 and an electronic device 400 according to the second embodiment of the present technology will be described with reference to FIG. 6. The electronic device 400 includes an electronic circuit 401 of an electronic device main body and the battery pack 300. The battery pack 300 is electrically connected to the electronic circuit 401 with a positive electrode terminal 331a and a negative electrode terminal 331b interposed therebetween. For example, the electronic device 400 has a configuration that allows a user to detachably attach the battery pack 300. The configuration of the electronic device 400 is not limited thereto, and the electronic device 400 may have a configuration in which the battery pack 300 is built in the electronic device 400 so that the user cannot remove the battery pack 300 from the electronic device 400.

When charging the battery pack 300, the positive electrode terminal 331a and the negative electrode terminal 331b of the battery pack 300 are respectively connected to a positive electrode terminal and a negative electrode terminal of a charger (not shown). On the other hand, when discharging the battery pack 300 (when using the electronic device 400), the positive electrode terminal 331a and the negative electrode terminal 331b of the battery pack 300 are respectively connected to the positive electrode terminal and the negative electrode terminal of the electronic circuit 401.

Examples of the electronic device 400 include notebook-type personal computers, tablet computers, mobile phones (e.g., smartphones) or personal digital assistants (PDAs); display devices (e.g., LCDs, EL displays, electronic paper); imaging devices (e.g., digital still cameras, digital video cameras); audio devices (e.g., portable audio players); game devices, cordless phone handsets, e-books, electronic dictionaries, radios, headphones, navigation systems, memory cards, pacemakers, hearing aids, electric tools, electric shavers, refrigerators, air conditioners, televisions, stereos, water heaters, microwave ovens, dishwashers, washing machines, driers, lighting devices, toys, medical devices, robots, road conditioners, and traffic lights, but it is not limited thereto.

The electronic circuit 401 includes, for example, a CPU or a processor, a peripheral logic unit, an interface unit, a memory unit including a ROM, a RAM or a non-volatile memory, and the like, and controls the entire of the electronic device 400.

The battery pack 300 includes an assembled battery 301 and a charge/discharge circuit 302. The assembled battery 301 is configured by connecting a plurality of secondary batteries 301a in series and/or in parallel. The plurality of secondary batteries 301a is connected, for example, in the form of n in parallel and m in series (n and m are positive integers). In FIG. 6, an example is illustrated in which six of the secondary batteries 301a are connected in the form of two in parallel and three in series (2P3S). As the secondary battery 301a, the battery according to the first embodiment or the modified example thereof is used.

The charge/discharge circuit 302 is a control unit that controls charging/discharging of the assembled battery 301. Specifically, the charge/discharge circuit 302 controls charging of the assembled battery 301 during charging. On the other hand, the charge/discharge circuit 302 controls discharging of the electronic device 400 during discharging (i.e., when using the electronic device 400).

In the above-mentioned second embodiment, the case where the battery pack 300 includes the assembled battery 301 formed of the plurality of secondary batteries 301a has been described as an example, but the configuration in which the battery pack 300 includes one secondary battery 301a instead of the assembled battery 301 may be employed.

In a third embodiment, a power storage system including the battery according to the first embodiment or the modified example thereof in a power storage device will be described. This power storage system may be any system as long as it almost uses electric power and includes merely an electric power device. This power system includes, for example, a smart grid, a household energy management system (HEMS), a vehicle, and the like, and can also store electricity.

Figure 7:
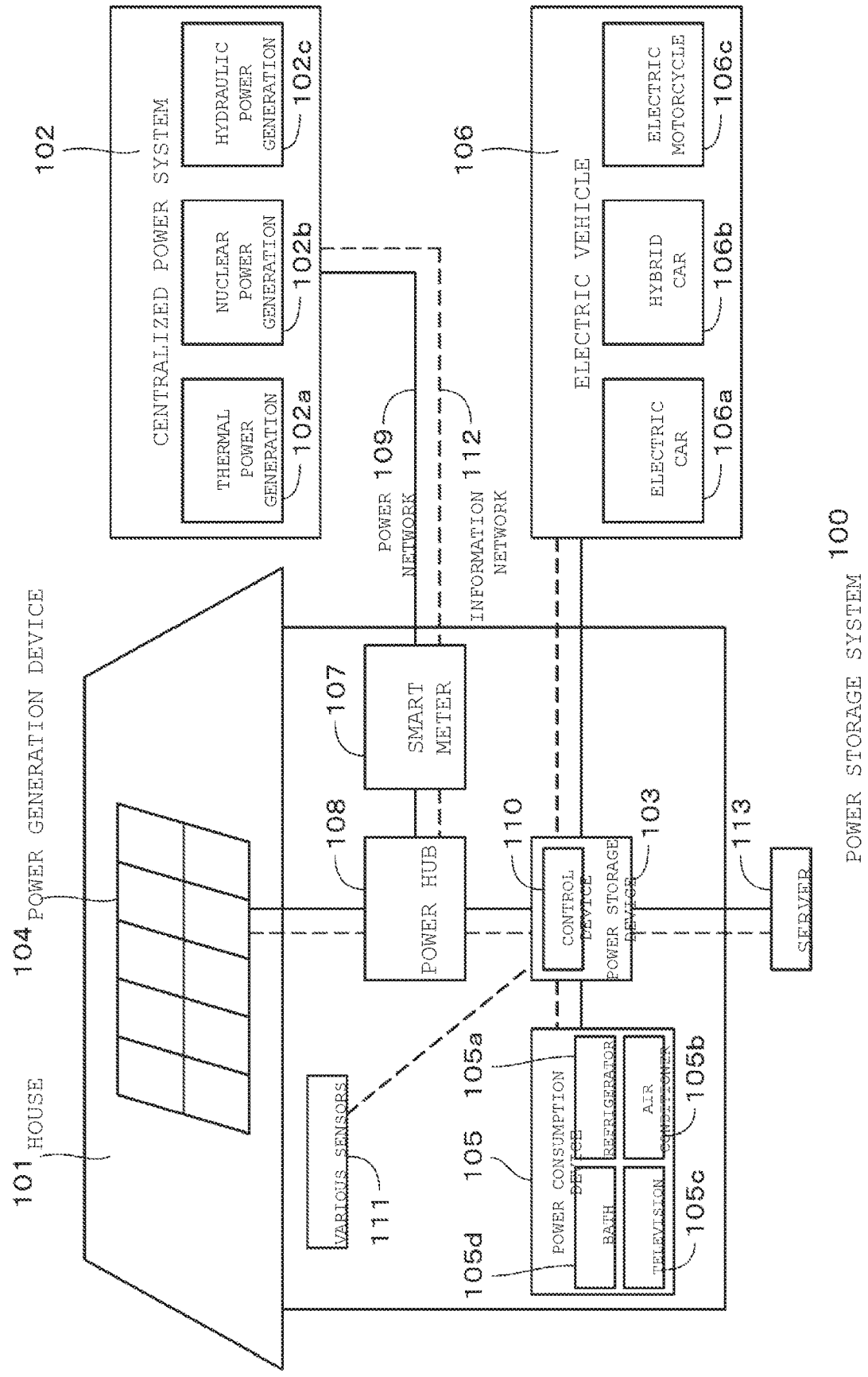
FIG. 7 is a schematic diagram illustrating a configuration example of a power storage system according to an embodiment of the present technology.

Hereinafter, the configuration example of the power storage system (power system) 100 according to the third embodiment will be described with reference to FIG. 7. This power storage system 100 is a power storage system for residential use, and electric power is supplied from a centralized power system 102 such as a thermal power generation 102a, a nuclear power generation 102b or a hydraulic power generation 102c to a power storage device 103 via a power network 109, an information network 112, a smart meter 107, a power hub 108, and the like. With this, electric power is supplied from an independent power supply such as a domestic power generation device 104 to the power storage device 103. The electric power supplied to the power storage device 103 is stored. Electric power to be used in a house 101 is supplied using the power storage device 103. A similar power storage system can be used not only for the house 101 but also for a building.

The house 101 is provided with the domestic power generation device 104, a power consumption device 105, the power storage device 103, a control device 110 (controller) for controlling each device, the smart meter 107, the power hub 108, and a sensor 111 for acquiring various kinds of information. Each device is connected by the power network 109 and the information network 112. A solar cell, a fuel cell, or the like is used as the domestic power generation device 104, and the generated electric power is supplied to the power consumption device 105 and/or the power storage device 103. The power consumption device 105 is a refrigerator 105a, an air conditioner 105b, a television receiver 105c, a bath 105d, or the like. Furthermore, the power consumption device 105 includes an electric vehicle 106. The electric vehicle 106 is an electric car 106a, a hybrid car 106b, an electric motorcycle 106c, or the like.

The power storage device 103 includes the battery according to the first embodiment or the modified example thereof. The smart meter 107 has a function of measuring the use amount of commercial electric power and sending the use amount measured to an electric power company. The power network 109 may be any one or combination of DC power feed, AC power feed, and non-contact power feed.

The various sensors 111 include, for example, a human sensor, an illuminance sensor, an object detection sensor, a power consumption sensor, a vibration sensor, a contact sensor, a temperature sensor, and an infrared sensor. Information acquired by the various sensors 111 is transmitted to the control device 110. Based on the information from the sensors 111, the state of weather, the state of person, and the like are grasped and the power consumption device 105 can be automatically controlled to minimize energy consumption. Further, the control device 110 can transmit information on the house 101 to an external power company or the like via the Internet.

The power hub 108 performs processes such as branching of power lines and DC/AC conversion. As a communication method of the information network 112 connected to the control device 110, a method of using a communication interface such as a Universal Asynchronous Receiver-Transmitter: transmission/reception circuit for asynchronous serial communication (UART) and a method of using a sensor network in accordance with a wireless communication standard, such as Bluetooth (registered trademark), ZigBee or Wi-Fi, can be utilized. The Bluetooth (registered trademark) system is applied to multimedia communication and can perform one-to-many connection communication. ZigBee uses the physical layer of IEEE (Institute of Electrical and Electronics Engineers) 802.15.4. IEEE 802.15.4 is a name of a short range wireless network standard called PAN (Personal Area Network) or W (Wireless) PAN.

The control device 110 is connected to an external server 113. This server 113 may be managed by any of the house 101, the power company, and a service provider. The information transmitted and received by the server 113 is, for example, power consumption information, life pattern information, a power fee, weather information, natural disaster information, and power trade information. This information may be transmitted and received from a power consumption device (e.g., a television receiver) in the home, but it may be transmitted and received from a device outside the home (e.g., a mobile phone). This information may be displayed on a device having a display function such as a television receiver, a mobile phone, a personal digital assistant (PDA) or the like.

The control device 110 that controls each unit is formed of a Central Processing Unit (CPU) or a processor, a Random Access Memory (RAM), and a Read Only Memory (ROM), and is housed in the power storage device 103 in this example. The control device 110 is connected to the power storage device 103, the domestic power generation device 104, the power consumption device 105, the various sensors 111, the server 113, and the information network 112. The control device 110 has, for example, a function of adjusting the use amount of commercial electric power and the amount of power generation. The control device 110 may have a function of performing electric power transaction in an electric power market.

As described above, not only electric power generated by the centralized power system 102 (such as the thermal power generation 102a, the nuclear power generation 102b, or the hydraulic power generation 102c), but also electric power generated by the domestic power generation device 104 (solar power generation, wind power generation) can be stored in the power storage device 103. Therefore, even if the electric power generated by the domestic power generation device 104 varies, it is possible to perform control such that the amount of electric power sent to the outside is made constant or is discharged as necessary. For example, electric power obtained by solar power generation is stored in the power storage device 103, low-cost late-night electric power is stored in the power storage device 103 in the night, and the electric power stored by the power storage device 103 is discharged and utilized in a high-cost time zone in the daytime.

Although the example in which the control device 110 is stored in the power storage device 103 has been described, the control device 110 may be stored in the smart meter 107 or may be configured singly. Further, the power storage system 100 may be used for a plurality of homes in collective housing, or may be used for a plurality of single-family houses.

In a fourth embodiment, an electric vehicle including the battery according to the first embodiment or the modified example thereof will be described.

Figure 8:
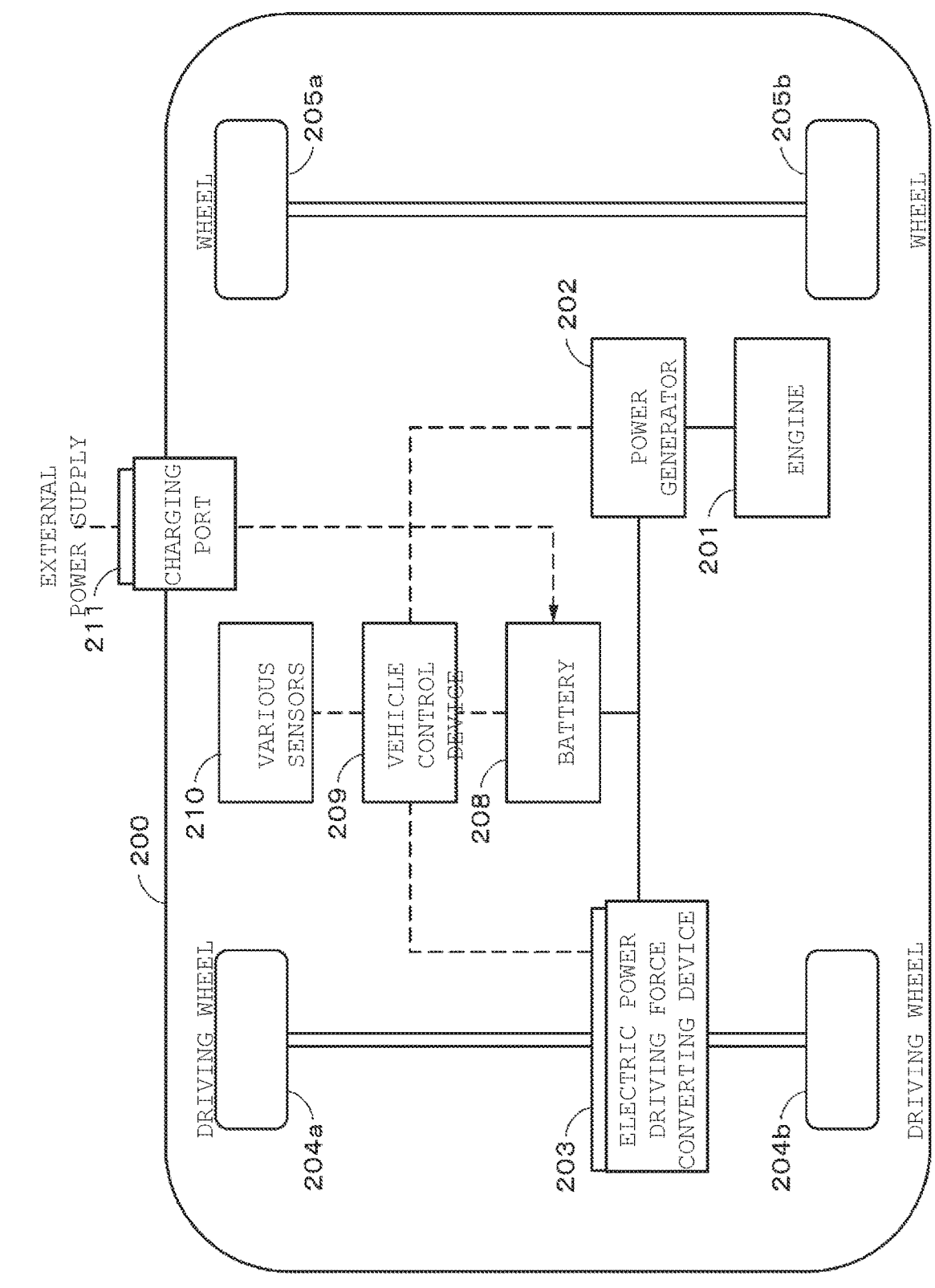
FIG. 8 is a schematic diagram illustrating a configuration example of an electric vehicle according to an embodiment of the present technology.

A configuration of the electric vehicle according to the fourth embodiment of the present technology will be described with reference to FIG. 8. A hybrid vehicle 200 is a hybrid vehicle employing a series hybrid system. The series hybrid system is a car that runs with an electric power driving force converting device 203 by using electric power generated by a power generator driven by an engine or electric power once stored in a battery.

In the hybrid vehicle 200, an engine 201, a power generator 202, an electric power driving force converting device 203, a driving wheel 204a, a driving wheel 204b, a wheel 205a, a wheel 205b, a battery 208, a vehicle control device 209, various sensors 210, and a charging port 211 are mounted. As the battery 208, the battery according to the first embodiment or the modified example thereof is used.

The hybrid vehicle 200 runs by using the electric power driving force converting device 203 as a power source. An example of the electric power driving force converting device 203 is a motor. The electric power driving force converting device 203 is operated by the electric power of the battery 208 and a rotational force of the electric power driving force converting device 203 is transmitted to the driving wheels 204a and 204b. It is to be noted that direct current-alternating current (DC-AC) conversion or reverse conversion (AC-DC conversion) is used for the necessary portion, whereby the electric power driving force converting device 203 can be applied to either an AC motor or a DC motor. The various sensors 210 control the rotation speed of the engine via the vehicle control device 209 and control the opening (throttle opening) of a throttle valve (not shown). The various sensors 210 include a speed sensor, an acceleration sensor, an engine speed sensor, and the like.

The rotational force of the engine 201 is transmitted to the power generator 202, and the electric power generated by the power generator 202 through the rotational force can be accumulated in the battery 208.

When the hybrid vehicle 200 decelerates by a braking mechanism (not shown), the resistance force at the time of deceleration is applied to the electric power driving force converting device 203 as a rotational force, and the regenerative electric power generated by the electric power driving force converting device 203 through the rotational force is accumulated in the battery 208.

The battery 208 is connected to a power supply outside the hybrid vehicle 200 through the charging port 211 so that it is possible to receive supply of electric power from the external power supply by using the charging port 211 as an input port and to thereby accumulate the received electric power.

Although not shown, the hybrid vehicle 200 may include an information processing device that performs information processing relating to vehicle control based on information on the battery. As such an information processing device, for example, there is an information processing device for displaying the remaining battery capacity based on information on the remaining capacity of the battery.

The above is an example of the series hybrid car that runs with a motor by using the electric power generated by a power generator driven by an engine or the electric power once stored in the battery. However, the present technology can be effectively applied to a parallel hybrid car which employs both outputs of engine and motor as the drive source, and uses, with appropriate switching, three systems, running by only the engine, running by only the motor, and running by the engine and the motor. Furthermore, the present technology can be effectively applied to a so-called electric vehicle which does not use an engine and runs by driving by only a driving motor.

EXAMPLES

Hereinafter, the present technology will be specifically described with reference to Examples, however, the present technology is not limited to only these Examples. In the following embodiments, parts corresponding to those of the above-mentioned embodiments are denoted by the same reference numerals. Further, the area densities $D_A$, $D_C$, $D_D$, and $D_F$ and the average area densities $D_B$ and $D_E$ in the following Examples are obtained by the method described in the first embodiment and the modified example thereof.

Example 1

The positive electrode 21 was produced in the following manner. First, 94 parts by mass of nickel-cobalt-manganese (NCM) as a positive electrode active material, 3 parts by mass of Denka Black (DB) as a conductive agent, and 3 parts by mass of polyvinylidene fluoride (PVDF) as a binder were mixed to form a positive electrode mixture, and the mixture was dispersed in N-methyl-2-pyrrolidone as a solvent to obtain a paste-like positive electrode mixture slurry. Next, the positive electrode mixture slurry was applied to both sides of the positive electrode current collector 21A made of a belt-like aluminum foil (thickness of 15 μm), dried, and compression-molded by a roll press machine to form the first and second positive electrode active material layers 21B and 21C. At this time, as shown in FIGS. 2A and 2B, the low area density portion 21D was formed in the first positive electrode active material layer 21B so that the low area density portion 21D was located at the position of one circumferential outer side from the winding start end portion of the positive electrode 21 during winding of the positive electrode 21. Thus, the positive electrode 21 having an electrode width of 58 mm was obtained. Then, the positive electrode lead 25 made of aluminum was welded and attached to the middle circumference portion of the positive electrode current collector 21A.

The volume density of each of the first and second positive electrode active material layers 21B and 21C obtained as described above was 3.7 g/cm$^3$, the average area density of each of the first and second positive electrode active material layers 21B and 21C was 28 mg/cm$^2$, and the area density $D_A$ of the low area density portion 21D of the first positive electrode active material layer 21B was 20 mg/cm$^2$.

The negative electrode 22 was produced in the following manner. First, 96 parts by mass of natural graphite as a negative electrode active material, 2 parts by mass of Denka black (DB) as a conductive agent, and 2 parts by mass of styrene butadiene rubber (SBR) as a binder were mixed to form a negative electrode mixture, and the mixture was dispersed in N-methyl-2-pyrrolidone to obtain a paste-like negative electrode mixture slurry. Next, the negative electrode mixture slurry was applied to both sides of the negative electrode current collector 22A made of a belt-like copper foil (thickness of 12 μm), dried, and compression-molded by a roll press machine to form the first and second negative electrode active material layers 22B and 22C. Next, the negative electrode lead 26 made of nickel was attached to one end of the negative electrode current collector 22A.

The volume density of each of the first and second negative electrode active material layers 22B and 22C obtained as described above was 1.5 g/cm³, and the average area density of each of the first and second positive electrode active material layers 21B and 21C was 13 mg/cm³.

An electrolytic solution was prepared in the following manner. Ethylene carbonate (EC) and dimethyl carbonate (DMC) as solvents and $LiPF_6$ as an electrolyte salt were mixed at a mass ratio of EC:DMC:$LiPF_6$=25:55:20 to prepare a nonaqueous electrolytic solution.

A battery was assembled in the following manner. First, the positive electrode 21 and the negative electrode 22 produced as described above were laminated with a separator 23 made of a microporous polyethylene stretched film having a thickness of 16 μm interposed therebetween in the order of the negative electrode 22, the separator 23, the positive electrode 21, and the separator 23, wound around a winding core having a diameter Φ of 3.0 mm, and wound many times, thereby forming a jelly roll type wound electrode body 20.

Next, the wound electrode body 20 was sandwiched between the pair of the insulating plates 12 and 13, the negative electrode lead 26 was welded to the battery can 11, the positive electrode lead 25 was welded to the safety valve mechanism 15, and the wound electrode body 20 was housed in the cylindrical battery can 11. Finally, the electrolytic solution prepared as described above was injected into the battery can 11 with the wound electrode body 20 housed therein, and then the safety valve mechanism 15, the PTC element 16, and the battery lid 14 were fixed by caulking the battery can 11 through the insulating sealing gasket 17, thereby producing a cylindrical battery having an outer diameter (diameter) of 18.20 mm and a height of 65 mm.

Example 2

A battery was produced in the same manner as in Example 1 except that the low area density portion 21D was continuously formed over a range exceeding one circumference from the inner circumference side end portion (tip end) of the first positive electrode active material layer 21B, as shown in FIGS. 3A and 3B. The area density $D_A$ of the low area density portion 21D of the first positive electrode active material layer 21B was 20 mg/cm².

Example 3

A battery was produced in the same manner as in Example 2 except that the low area density portion 21D was further formed at the outer circumference side end portion of the first positive electrode active material layer 21B, as shown in FIGS. 4A and 4B. The area densities $D_A$ and $D_C$ the low area density portion 21D at the inner circumference side end portion and the outer circumference side end portion of the first positive electrode active material layer 21B were 20 mg/cm².

Example 4

A battery was produced in the same manner as in Example 3 except that the low area density portion 21E was further formed at both end portions on the inner circumference side and the outer circumference side of the second positive electrode active material layer 21C, as shown in FIGS. 5A and 5B. The area densities $D_E$ and $D_F$ of the low area density portion 21E at the inner circumference side end portion and the outer circumference side end portion of the second positive electrode active material layer 21C were 20 mg/cm².

Comparative Example 1

A battery was produced in the same manner as in Example 1 except that the low area density portion 21D was not formed at the first positive electrode active material layer 21B, as shown in FIGS. 9A and 9B.

Comparative Example 2

A battery was produced in the same manner as in Example 1 except that the low area density portion 21D was continuously formed over a range less than one circumference from the inner circumference side end portion (tip end) of the first positive electrode active material layer 21B, as shown in FIGS. 10A and 10B. The area density $D_A$ of the low area density portion 21D of the first positive electrode active material layer 21B was 20 mg/cm².

The batteries obtained as described above were evaluated in the following manner.

The presence or absence of the generation of a break in the positive electrode 21 during winding was confirmed in the following manner. First, the positive electrode 21, the negative electrode 22, and the separator 23 were prepared, which were the same as those used for producing the batteries of Examples 1 to 4 and Comparative Examples 1 and 2. Next, it was confirmed whether or not a break was generated in the positive electrode 21 during winding when the negative electrode 22, the separator 23, the positive electrode 21, and the separator 23 were laminated in this order and wound around a winding core of Φ3.0 mm to form the wound electrode body 20. In Examples 1 to 4 and Comparative Examples 1 and 2, in each of the wound electrode bodies 20 of Examples 1 to 4 and Comparative Examples 1 and 2, a winding core having a diameter Φ of 3.5 mm was used and its probability of generation of a break in the positive electrode 21 was low.

(Before Low Temperature Cycle Test)

A severe test was performed by a drop test including applying an impact to each battery from the outside, and the number of short-circuited batteries was determined. Next, the probability of occurrence of short circuit was calculated by the following formula:

(Probability of occurrence of short circuit)[%]= ((number of short-circuited batteries)/(number of batteries subjected to drop test))×100

(After Low Temperature Cycle Test)

First, a cycle test was performed at a low temperature (0° C.) at which the wound electrode body 20 expanded due to Li precipitation in the negative electrode 22 and the internal pressure was increased, and the separator 23 was damaged by the step difference at the end portion of the positive electrode 21. Thereafter, the probability of occurrence of short circuit was determined in the same manner as the drop test before the low temperature cycle test.

Details of the cycle and drop tests are shown below.
Ambient temperature: 0° C.
Charging: CC/CV, 4.25 V/1 C, 100 mA cut
Discharging: 2 C, 2 V cut (charging was restarted after the temperature of the discharged cell became 0° C.) The discharge rate was decreased to 1 C after the retention rate [%] with respect to the initial discharge capacity became 30% or less, and similarly to the above, the discharge rate was decreased to 0.5 C after the retention rate became 30% or less, and the test was conducted until the retention rate became 30% or less.

The used drop test was a partially modified drop test in accordance with "lithium secondary battery safety evaluation standard guidelines" (SBA G1101). Specifically, the drop test prescribed in SBA G1101 is a test to drop cells 10 times on concrete from a distance of 1.9 m, however, in the drop test of this evaluation, a limit test was performed by setting a drop number n to 20, and the probability of occurrence of short circuit (n=10) was investigated.

Table 1 shows the configurations and evaluation results of the batteries of Examples 1 to 4 and Comparative Examples 1 and 2.

ference side end portion (tip end) so that it is possible to suppress the probability of occurrence of short circuit due to the drop test (Example 2). This is because the step difference at the inner circumference side end portion of the positive electrode 21 is reduced by the low area density portion 21D, and the damage applied to the separator 23 is suppressed by the inner circumference side end portion of the positive electrode 21.

The first positive electrode active material layer 21B has the low area density portion 21D on both the inner circumference side end portion and the outer circumference side end portion so that it is possible to suppress the probability of occurrence of short circuit due to the drop test (Example 3). This is because the step difference at both end portions on the inner circumference side and the outer circumference

TABLE 1

| | Battery structure | Area density of low area density portion $D_A$ [mg/cm$^2$] | Average area density $D_B$ [mg/cm$^2$] | Area density ratio $D_A/D_B$ | Brakeage in positive electrode during winding | Before low temperature cycle Probability of occurrence of short circuit in drop test [%] | After low temperature cycle Probability of occurrence of short circuit in drop test [%] |
|---|---|---|---|---|---|---|---|
| Example 1 | FIGS. 2A and 2B | 20 | 28 | 0.71 | No | 0 | 30 |
| Example 2 | FIGS. 3A and 3B | 20 | 28 | 0.71 | No | 0 | 20 |
| Example 3 | FIGS. 4A and 4B | 20 | 28 | 0.71 | No | 0 | 10 |
| Example 4 | FIGS. 5A and 5B | 20 | 28 | 0.71 | No | 0 | 0 |
| Comparative Example 1 | FIGS. 9A and 9B | 28 | 28 | 1.00 | Yes | 0 | 30 |
| Comparative Example 2 | FIGS. 10A and 10B | 20 | 28 | 0.71 | Yes | 0 | 20 |

The following can be seen from the above evaluation. The first positive electrode active material layer 21B provided on the inner surface of the positive electrode current collector 21A has the low area density portion 21D at a portion facing the inner circumference side end portion of the positive electrode 21, so that it is possible to ensure the flexibility of the positive electrode 21 at the position of one circumferential outer side from the winding start end portion of the positive electrode 21, thereby preventing the generation of a break in the positive electrode 21 during winding (Examples 1 to 4). On the other hand, in the case where the first positive electrode active material layer 21B does not have the low area density portion 21D at the portion facing the inner circumference side end portion of the positive electrode 21, it is not possible to ensure the flexibility of the positive electrode 21 at the position of one circumferential outer side from the winding start end portion of the positive electrode 21, thereby forming a break in the positive electrode 21 during winding (Comparative Example 1). Further, even in the case where the first positive electrode active material layer 21B continuously has the low area density portion 21D over a range less than one circumference from the inner circumference side end portion (tip end), it is not possible to ensure the flexibility of the positive electrode 21 at the position of one circumferential outer side from the winding start end portion of the positive electrode 21, thereby forming a break in the positive electrode 21 during winding (Comparative Example 2).

The first positive electrode active material layer 21B continuously has the low area density portion 21D over a range exceeding one circumference from the inner circumference side of the positive electrode 21 is reduced by the low area density portion 21D, and the damage applied to the separator 23 is suppressed by the inner circumference side end portion and the outer circumference side end portion of the positive electrode 21.

The first positive electrode active material layer 21B has the low area density portion 21D on both the inner circumference side end portion and the outer circumference side end portion, and the second positive electrode active material layer 21C has the low area density portion 21E at both the inner circumference side end portion and the outer circumference side end portion, so that it is possible to suppress the most the probability of occurrence of short circuit due to the drop test (Example 4). This is because the step difference at both end portions on the inner circumference side and the outer circumference side of the positive electrode 21 is significantly reduced by the low area density portions 21D and 21E, and the damage applied to the separator 23 is significantly suppressed by the inner circumference side end portion and the outer circumference side end portion of the positive electrode 21.

Although the embodiments, the modified examples thereof, and the examples of the present technology have been specifically described above, the present technology is not limited to the above-described embodiments, the modified examples thereof, and the examples, and various modifications based on the technical idea of the present technology can be made.

For example, the configurations, methods, processes, shapes, materials, numerical values, and the like mentioned in the above embodiments, the modified examples thereof, and the examples are merely examples, and different configurations, methods, processes, shapes, materials, numerical values, and the like may be used if necessary.

Further, the configurations, methods, processes, shapes, materials, numerical values, and the like of the above-described embodiments, the modified examples thereof, and the examples can be combined with each other without departing from the gist of the present technology.

The present technology is described below in a further detail according to an embodiment.

(1) A battery including wound positive and negative electrodes, where the positive electrode includes a positive electrode current collector, a first positive electrode active material layer provided on an inner surface of the positive electrode current collector, and a second positive electrode active material layer provided on an outer surface of the positive electrode current collector, an inner circumference side end portion and an outer circumference side end portion of the positive electrode current collector are covered with the first positive electrode active material layer and the second positive electrode active material layer, and the first positive electrode active material layer includes a low area density portion at the inner circumference side end portion of the positive electrode;

(2) The battery according to (1), where the low area density portion has an area density lower than an average area density of the first positive electrode active material layer;

(3) The battery according to (1) or (2), where an area density ratio $D_A/D_B$ between an area density $D_A$ of the low area density portion and an average area density $D_B$ of the first positive electrode active material layer satisfies a relationship of $D_A/D_B \leq 0.98$;

(4) The battery according to any one of (1) to (3), where the low area density portion is provided over a range exceeding one circumference from an inner circumference side end portion of the positive electrode;

(5) The battery according to any one of (1) to (4), where the first positive electrode active material layer further includes a low area density portion at an outer circumference side end portion of the positive electrode;

(6) The battery according to any one of (1) to (5), where the second positive electrode active material layer further includes a low area density portion at least one of the inner circumference side end portion and the outer circumference side end portion of the positive electrode;

(7) The battery according to (4) or (6), further including a separator wound together with the positive electrode and the negative electrode, where an inner circumference side end portion of the separator is wound longer than the inner circumference side end portion of the positive electrode;

(8) The battery according to (5) or (6), further including a separator wound together with the positive electrode and the negative electrode, where an outer circumference side end portion of the separator is wound longer than the outer circumference side end portion of the positive electrode;

(9) The battery according to any one of (1) to (8), where the low area density portion provided in a portion facing the inner circumference side end portion of the positive electrode is locally provided in a portion facing the inner circumference side end portion of the positive electrode;

(10) The battery according to any one of (1) to (8), further including a cylindrical battery can that houses the positive electrode and the negative electrode;

(11) A battery including a wound electrode, where the electrode includes a current collector, a first active material layer provided on an inner surface of the current collector, and a second active material layer provided on an outer surface of the current collector, an inner circumference side end portion and an outer circumference side end portion of the current collector are covered with the first active material layer and the second active material layer, and the first active material layer includes a low area density portion in a portion facing an inner circumference side end portion of the electrode;

(12) A battery pack including: the battery according to any one of (1) to (11); and a control unit that controls the battery;

(13) An electronic device that includes the battery according to any one of (1) to (11) and receives supply of electric power from the battery;

(14) An electric vehicle including: the battery according to any one of (1) to (11); a converting device that receives supply of electric power from the battery and converts the electric power to a driving force of a vehicle; and a control device that performs information processing on vehicle control based on information on the battery;

(15) A power storage device that includes the battery according to any one of (1) to (11) and supplies electric power to an electronic device connected to the battery; and

(16) A power system that includes the battery according to any one of (1) to (11) and receives supply of electric power from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising wound positive and negative electrodes,
wherein the wound positive electrode includes a positive electrode current collector, a first positive electrode active material layer provided on an inner surface of the positive electrode current collector, and a second positive electrode active material layer provided on an outer surface of the positive electrode current collector,
an inner circumference side end portion and an outer circumference side end portion of the positive electrode current collector are covered with the first positive electrode active material layer and the second positive electrode active material layer,
the first positive electrode active material layer includes a low area density portion at an inner circumference side end portion of the wound positive electrode, and
wherein the first positive electrode active material layer further includes a low area density portion at an outer circumference side end portion of the wound positive electrode.

2. The battery according to claim 1, wherein the low area density portion at the inner circumference side end portion of the wound positive electrode has an area density lower than an average area density of the first positive electrode active material layer.

3. The battery according to claim 1, wherein an area density ratio DA/DB between an area density DA of the low area density portion at the inner circumference side end portion of the wound positive electrode and an average area density DB of the first positive electrode active material layer satisfies a relationship of $D_A/D_B \leq 0.98$.

4. The battery according to claim 1, wherein the low area density portion at the inner circumference side end portion of the wound positive electrode is provided over one circumference from the inner circumference side end portion of the wound positive electrode.

5. The battery according to claim 4, further comprising a separator wound together with the wound positive electrode and the wound negative electrode,
wherein an inner circumference side end portion of the separator is wound longer than the inner circumference side end portion of the wound positive electrode.

6. The battery according to claim 1, further comprising a separator wound together with the wound positive electrode and the wound negative electrode,
wherein an outer circumference side end portion of the separator is wound longer than the outer circumference side end portion of the wound positive electrode.

7. The battery according to claim 1, wherein the second positive electrode active material layer further includes a low area density portion at one or both of an inner circumference side end portion and an outer circumference side end portion of the wound positive electrode.

8. The battery according to claim 1, wherein the low area density portion at the inner circumference side end portion of the wound positive electrode is provided in a portion facing the inner circumference side end portion of the wound positive electrode.

9. The battery according to claim 1, further comprising a cylindrical battery can configured to house the wound positive electrode and the wound negative electrode.

10. A battery comprising a wound electrode,
wherein
the wound electrode includes a current collector, a first active material layer provided on an inner surface of the current collector, and a second active material layer provided on an outer surface of the current collector,
an inner circumference side end portion and an outer circumference side end portion of the current collector are covered with the first active material layer and the second active material layer, and
the first active material layer includes a low area density portion in a portion facing an inner circumference side end portion of the wound electrode,
wherein the first active material layer further includes a low area density portion at an outer circumference side end portion of the wound electrode.

11. A battery pack comprising:
the battery according to claim 1; and
a controller configured to control the battery.

12. An electronic device that includes the battery according to claim 1 and is configured to receive supply of electric power from the battery.

13. An electric vehicle comprising:
the battery according to claim 1;
a converting device configured to receive supply of electric power from the battery and convert the electric power to a driving force of a vehicle; and
a controller configured to perform information processing on vehicle control based on information on the battery.

14. A power storage device that includes the battery according to claim 1 and is configured to supply electric power to an electronic device connected to the battery.

15. A power system that includes the battery according to claim 1 and is configured to receive supply of electric power from the battery.

* * * * *